United States Patent
Lee et al.

(10) Patent No.: US 10,282,577 B2
(45) Date of Patent: May 7, 2019

(54) TOUCH-SENSING APPARATUS AND ELECTRONIC APPLIANCE INCLUDING THE SAME

(71) Applicant: LG INNOTEK CO., LTD., Seoul (KR)

(72) Inventors: Ho Min Lee, Seoul (KR); Soung Kyu Park, Seoul (KR); Jin Seok Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/631,612

(22) Filed: Jun. 23, 2017

(65) Prior Publication Data

US 2017/0372115 A1 Dec. 28, 2017

(30) Foreign Application Priority Data

Jun. 24, 2016 (KR) .................. 10-2016-0079116

(51) Int. Cl.
  *G06F 3/041* (2006.01)
  *G06K 9/00* (2006.01)
  *G06F 3/044* (2006.01)

(52) U.S. Cl.
  CPC ......... *G06K 9/00006* (2013.01); *G06F 3/044* (2013.01); *G06F 2203/04102* (2013.01); *G06F 2203/04103* (2013.01)

(58) Field of Classification Search
  CPC ..... G06K 9/00006; G06F 3/044; G06F 3/041; G06F 3/0412; G06F 2203/0338
  See application file for complete search history.

(56) References Cited

U.S. PATENT DOCUMENTS

| | | | |
|---|---|---|---|
| 2010/0028610 A1* | 2/2010 | Fujii | B32B 37/02 428/164 |
| 2014/0300835 A1* | 10/2014 | Chu | G06F 3/0412 349/12 |
| 2017/0068365 A1* | 3/2017 | Liu | G06F 3/0412 |
| 2017/0205958 A1* | 7/2017 | Kurasawa | G06F 3/0418 |

FOREIGN PATENT DOCUMENTS

| | | |
|---|---|---|
| JP | 2000-196024 | 7/2000 |
| JP | 2013-106308 | 5/2013 |
| KR | 10-0954894 | 4/2010 |

* cited by examiner

*Primary Examiner* — Adam R. Giesy
(74) *Attorney, Agent, or Firm* — Ked & Associates, LLP

(57) ABSTRACT

A touch-sensing apparatus and an electronic appliance including a touch-sensing apparatus are provided. The touch-sensing apparatus may include a substrate having an effective area and a non-effective area, a first decorative layer provided within a cavity provided in the non-effective area of the substrate, and having at least one groove that exposes a bottom surface of the cavity, a second decorative layer provided inside the at least one groove of the first decorative layer, and a fingerprint sensor provided on the first and second decorative layers.

16 Claims, 23 Drawing Sheets

FIG. 10A
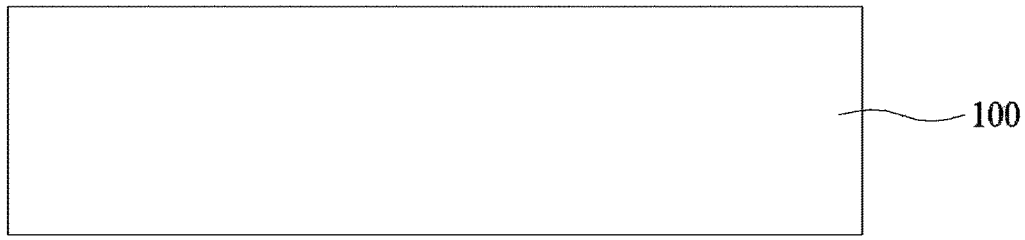
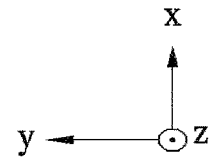
FIG. 10B
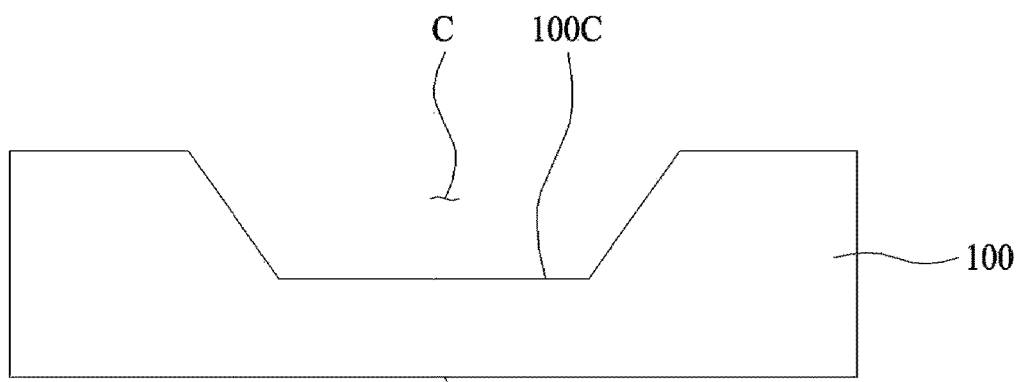
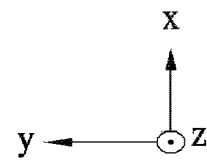

FIG. 10C
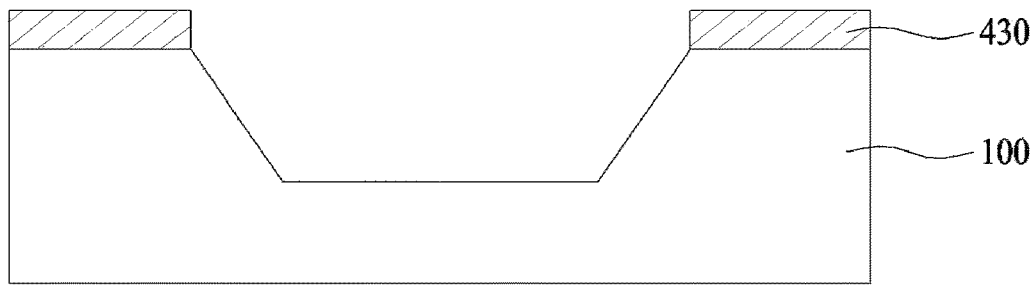
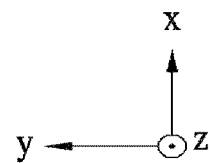
FIG. 10D
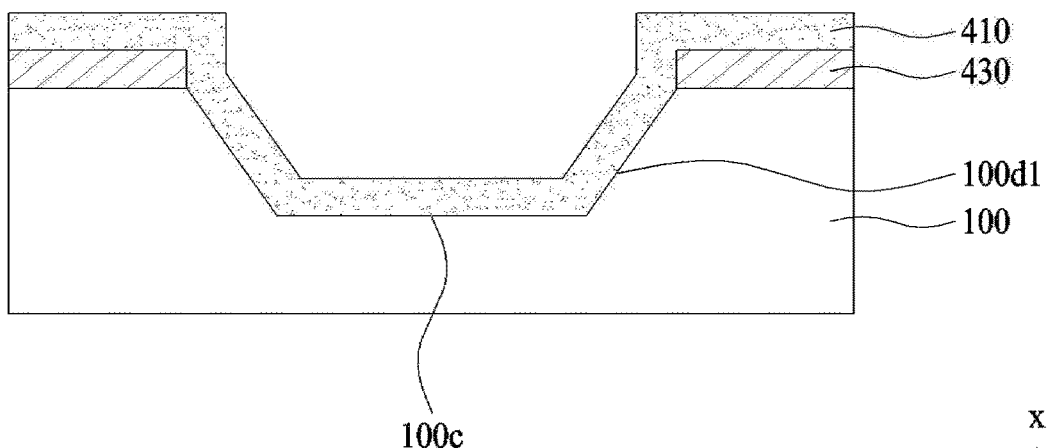
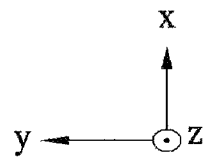

FIG. 10E
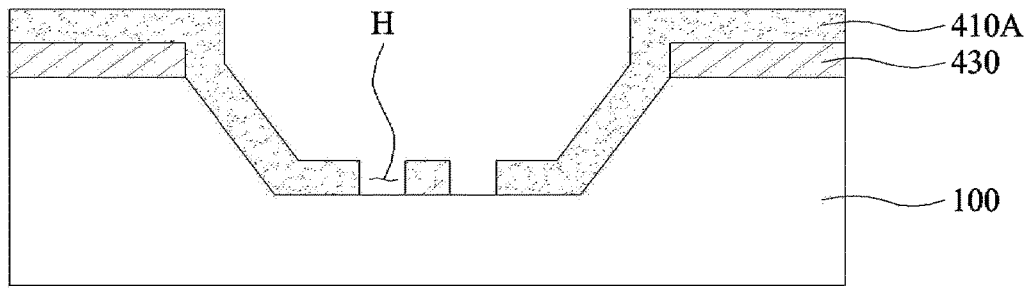
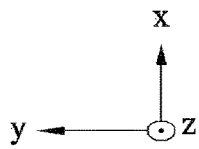
FIG. 10F
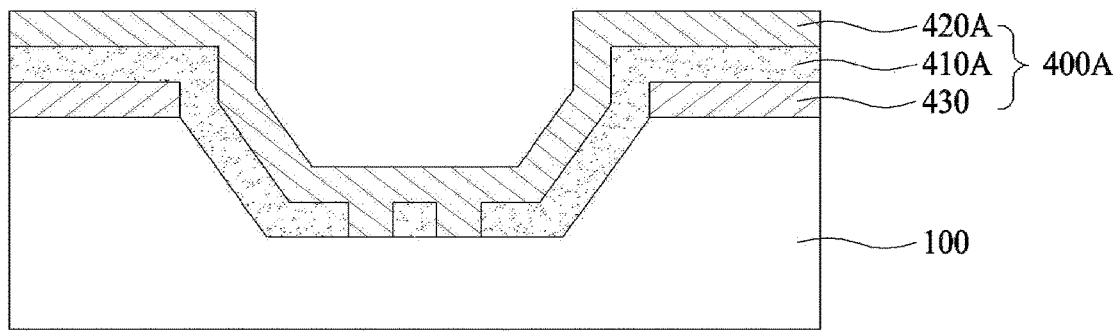
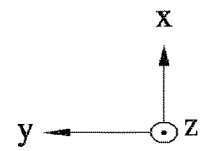

TOUCH-SENSING APPARATUS AND ELECTRONIC APPLIANCE INCLUDING THE SAME

CROSS-REFERENCE TO RELATED APPLICATION

This application claims priority under 35 U.S.C. § 119 to Korean Patent Application No. 10-2016-0079116, filed in Korea on Jun. 24, 2016, the entire disclosure of which is incorporated herein by reference.

BACKGROUND

1. Field

A touch-sensing apparatus and an electronic appliance including a touch-sensing apparatus are provided.

2. Background

Fingerprint sensing techniques may be used in personal identification fields, such as, e.g., in biometrics or authentication processes. For example, a fingerprint verification or recognition sensor such as a fingerprint sensor may be used in order to grant access to an electronic appliance such as a smart phone. In a touch-sensing apparatus including such a fingerprint sensor, the fingerprint sensor may be provided in an area, such as a "non-effective area", that does not include a display area, or an "effective area". After a separate blind hole is formed in the non-effective area of a cover substrate included in the touch-sensing apparatus, a button-type fingerprint sensor may be inserted into the blind hole.

In the non-effective area of the cover substrate, in order for a wiring electrode and a printed circuit board, which connects the wiring electrode to an external circuit, to be invisible from an outside, a material having a predetermined color may be applied to form a decorative layer. The decorative layer may be provided between the cover substrate and the fingerprint sensor.

Various attempts have recently been made in order to add a design to the decorative layer. If a thick decorative layer engraved with a shape such as logo is formed on a glass substrate by a pad-printing method, the shape may be recognized together or mistaken with the fingerprint by the fingerprint sensor, thereby lowering a recognition rate of the fingerprint sensor.

BRIEF DESCRIPTION OF THE DRAWINGS

The embodiments will be described in detail with reference to the following drawings in which like reference numerals refer to like elements wherein:

FIG. 10A to FIG. 10F are cross-sectional views of a method of manufacturing the touch-sensing apparatus according to the embodiment illustrated in FIG. 3;

DETAILED DESCRIPTION

Figure 1:
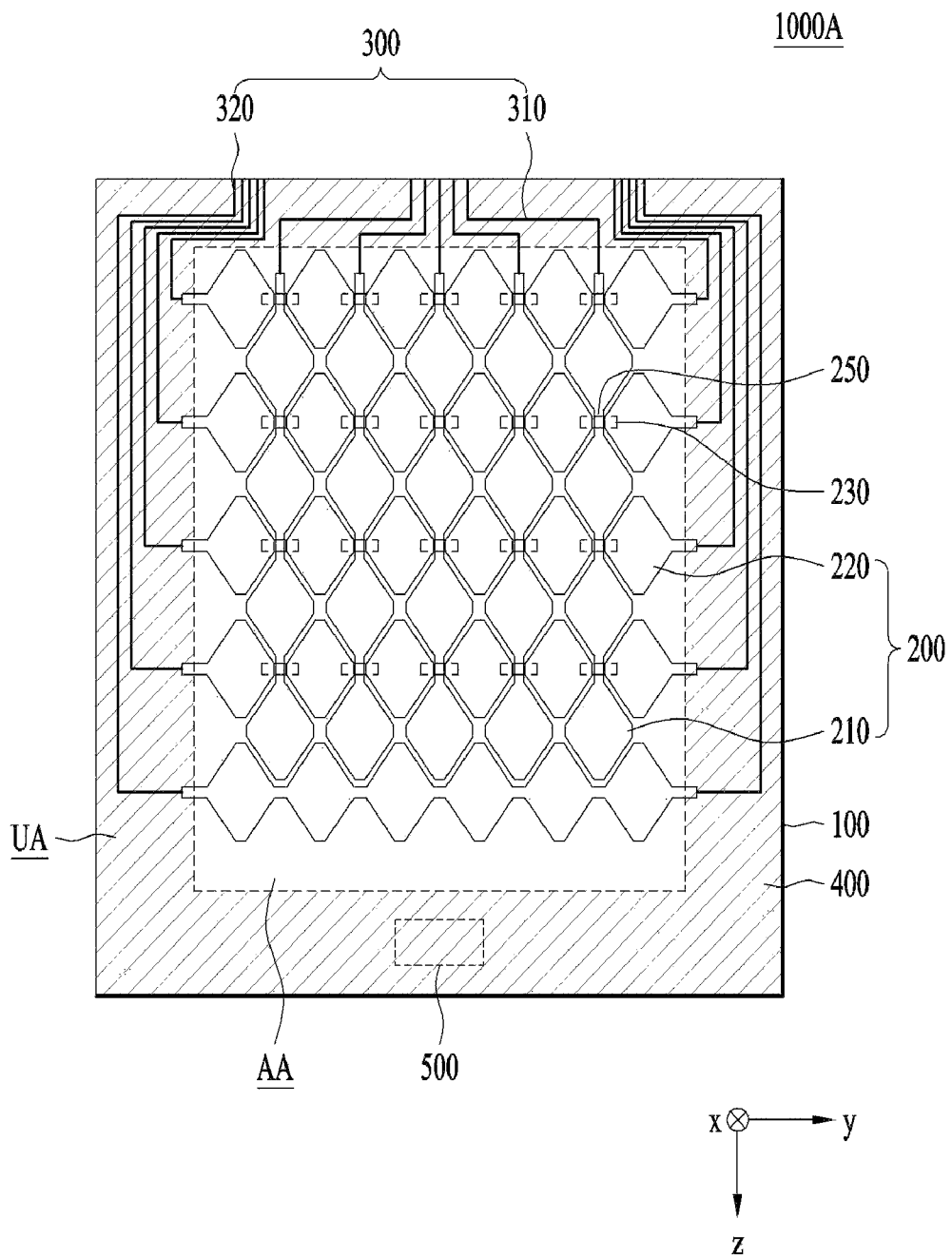
FIG. 1 is a plan view of a touch-sensing apparatus according to an embodiment.

Touch-sensing apparatuses 1000A, 1000B, 1000C, and 1000D according to embodiments may be described with reference to the accompanying drawings. For convenience, although the touch-sensing apparatuses 1000A, 1000B, 1000C, and 1000D and the touch devices 2000A to 2000C may be described using the Cartesian coordinate system (a x-axis, a y-axis and a z-axis), they may of course be described using other coordinate systems. With the Cartesian coordinate system, although the x-axis, the y-axis, and the z-axis are orthogonal to one another, the embodiments are not limited thereto. The x-axis, the y-axis, and the z-axis may cross one another, rather than being orthogonal to one another.

The touch-sensing apparatuses 1000A to 1000D according to the embodiments may correspond to any apparatus that includes a substrate 100 having a cavity portion or cavity (e.g., a recess or a blind hole) C formed therein and a functional sensor such as a fingerprint or touch sensor 500 inserted into the cavity portion C. Although the touch-sensing apparatuses 1000A to 1000D may further include a sensing electrode 200 and a wiring electrode 300, the embodiments are not limited to specific positions at which the sensing electrode 200 and the wiring electrode 300 may be provided. The sensing electrode 200 and the wiring electrode 300 may be provided as an add-on type, an in-cell type, or an on-cell type. The add-on type, the in-cell type, and the on-cell type are described later.

The touch-sensing apparatuses 1000A to 1000D according to the embodiments may further include a decorative layer 400 (400A, 400B, 400C, 400D, or 400E). The decorative layer 400 (400A, 400B, 400C, 400D, or 400E) may be located around a functional sensor such as the fingerprint sensor 500, for example, where the fingerprint sensor 500 is located in a bezel area, which is an edge of the touch-sensing apparatuses 1000A to 1000D. The decorative layer 400 (400A, 400B, 400C, 400D, or 400E) may assist in position identification of the fingerprint sensor.

Figure 2:
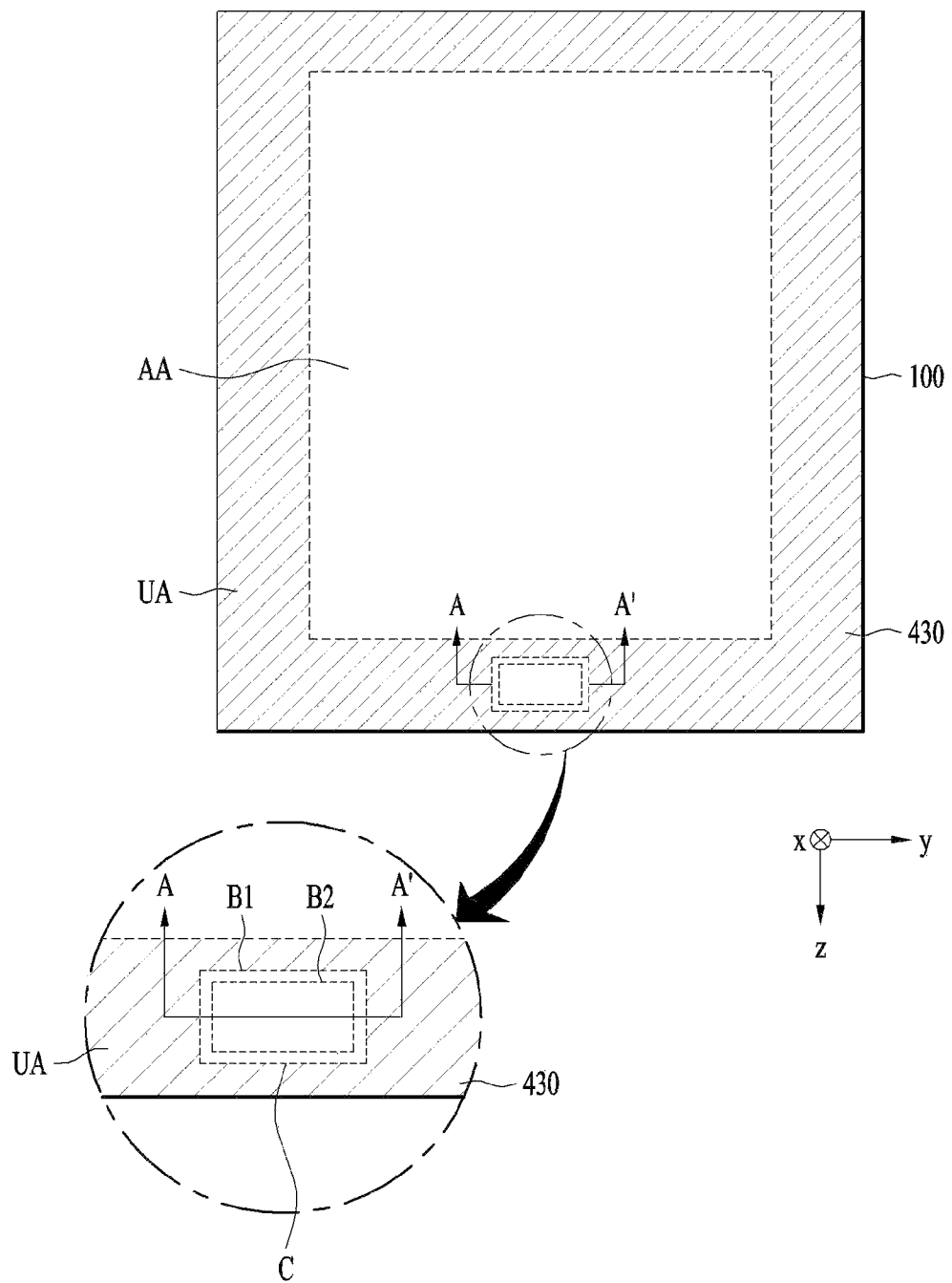
FIG. 2 is a plan view of a substrate illustrated in FIG. 1 and a decorative layer.

FIG. 1 is a plan view of the touch-sensing apparatus 1000A according to an embodiment, and FIG. 2 is a plan view of the substrate 100 illustrated in FIG. 1 and a third decorative layer 430 of any one among the decorative layers 400 (400A, 400B, 400C, 400D, and 400E). 'C' represents a cavity portion described later. Although the cavity portion C may not be visible when the substrate 100 is viewed outside from the +x axis direction to the −x axis direction, the cavity portion C is represented by a dotted line for convenience.

Referring to FIG. 1, the touch-sensing apparatus 1000A may include the substrate 100, the sensing electrode 200, the wiring electrode 300, the decorative layer 400, and the fingerprint sensor 500. The substrate 100 may include glass or plastic, and, for example, may include chemically reinforced/semi-reinforced glass such as soda lime glass or alumino silicate glass, may include reinforced or flexible plastic such as polyimide (PI), polyethylene terephthalate (PET), propylene glycol (PPG) or polycarbonate (PC), or may include sapphire, without being limited thereto. Since sapphire has excellent electrical properties such as dielectric permittivity, thereby being capable of increasing a touch response speed and easily recognizing a spatial touch such as hovering, and has high surface strength, it may be a material of the substrate 100. Hovering may be a technique that recognizes coordinates at a slight distance from a display.

The substrate 100 may include an optical isotropic film. The substrate 100 may include a cyclic olefin copolymer (COC), a cyclic olefin polymer (COP), optical isotropic polycarbonate (PC), or optical isotropic polymethylmethacrylate (PMMA), without being limited thereto. Although the substrate 100 may be bendable or may not be bendable, the embodiments are not limited as to the properties of the substrate 100. The substrate 100 may be bendable while partially having a curved surface. A portion of the substrate 100 may have a flat surface and a remaining portion may have a curved surface. For example, an end of the substrate 100 may have a curved surface and be bendable, or may be bendable or foldable with including surface having a random curvature.

The entire substrate 100 may be a flexible substrate having flexibility. If the substrate 100 is a curved substrate or a bended substrate, the touch-sensing apparatus 1000A including the substrate 100 may be formed also so as to be flexible, curved, or bendable. Thereby, the touch-sensing apparatus 1000A according to the embodiment may be portable, and may have various modified designs.

The substrate 100 may cover all or part of the front surface or the back surface of the touch-sensing apparatus 1000A. The substrate 100 may be divided into an effective area AA and a non-effective area or a bezel area UA. The effective area AA may be defined as a display area, and the non-effective area UA may be defined as a non-display area that may be provided around the effective area AA.

When a touch subject or an input device touches at least one of the effective area AA or the non-effective area UA, the touch-sensing apparatus 1000A may sense a touched position. The input device may be, for example, e.g., a finger or a stylus pen. For example, when the input device such as a finger touches the touch-sensing apparatus 1000A, the portion touched by the input device may undergo variation in capacitance. Thereby, the touch-sensing apparatus 1000A may detect the corresponding portion undergoing the variation as a touched position.

The sensing electrode 200 and the wiring electrode 300 may be provided on the substrate 100. The substrate 100 may serve to support the sensing electrode 200 and the wiring electrode 300. A separate subsidiary substrate may further be provided on the substrate 100. The sensing electrode 200 and the wiring electrode 300 may be supported by the subsidiary substrate, and the subsidiary substrate and the substrate 100 may be directly or indirectly adhered to each other using, for example, an adhesive. A further provision of the subsidiary substrate in addition to the substrate 100 may be advantageous for mass production of the touch-sensing apparatus 1000A.

The sensing electrode 200 may be provided in the effective area AA of the substrate 100, and may include a first sensing electrode 210 and a second sensing electrode 220. The first sensing electrode 210 and the second sensing electrode 220 may extend in different directions and may be provided on the substrate 100. The first sensing electrode 210 may extend in a first direction (e.g., the z-axis direction) in the effective area AA of the substrate 100 and may be provided on one surface of the substrate 100. The second sensing electrode 220 may extend in a second direction (e.g. the y-axis direction), which may be different from the first direction, in the effective area AA of the substrate 100 and may be provided on one surface of the substrate 100. The first sensing electrode 210 and the second sensing electrode 220 may be provided on the same surface of the substrate 100 and may be provided so as to extend in different directions. The first sensing electrode 210 and the second sensing electrode 220 may be provided on the substrate 100 so as to be electrically separated from each other.

The first sensing electrode 210 may include multiple first unit sensing electrodes connected to each other, and the second sensing electrode 220 may include multiple second unit sensing electrodes connected to each other. The multiple first unit sensing electrodes may be provided so as to be electrically spaced apart from the multiple second unit sensing electrodes. The multiple second unit sensing electrodes may be connected to each other via a bridge electrode 230. The multiple second unit sensing electrodes may be electrically spaced apart from the multiple first unit sensing electrodes by an insulating material or insulator 250, which may be provided where the bridge electrode 230 is provided. The first sensing electrode 210 and the second sensing electrode 220 may be insulated from each other, rather than coming into contact with each other, and may be provided on the same surface in the effective area AA of the substrate 100.

At least one sensing electrode of the first sensing electrode 210 or the second sensing electrode 220 may include a transparent conductive material that enables a flow of electricity without preventing transmission of light. For example, although each of the first and second sensing electrodes 210 and 220 may include at least one of indium tin oxide, indium zinc oxide, copper oxide, tin oxide, zinc oxide, or titanium oxide, the embodiments are not limited thereto. When each of the first and second sensing electrodes 210 and 220 is formed of a transparent material, a degree of freedom may be improved when the pattern of the first and second sensing electrodes 210 and 220 is formed in the effective area AA.

At least one of the first sensing electrode 210 or the second sensing electrode 220 may include at least one of a nanowire, photosensitive nanowire film, carbon nanotube (CNT), graphene, or conductive polymer, or a mixture thereof. Thereby, when the touch-sensing apparatus 1000A is manufactured so as to be flexible and/or bendable, freedom in a design thereof may be improved. For example, when the first or second sensing electrode 210 or 220 is formed of a nano composite such as a nanowire or carbon nanotube (CNT), the first or second sensing electrode 210 or 220 may be black and may freely change color and reflectivity thereof while achieving electrical conductivity via control of a content of nanopowder. Thereby, a degree of freedom may be improved when the touch-sensing apparatus 1000A is manufactured so as to be flexible and/or bendable. At least one of the first sensing electrode 210 or the second sensing electrode 220 may include various metals. For example, the sensing electrode 200 may include at least one of chrome (Cr), nickel (Ni), copper (Cu), aluminum (Al), silver (Ag), molybdenum (Mo), gold (Au), or titanium (Ti), or at least one metal of alloys thereof.

At least one of the first sensing electrode 210 or the second sensing electrode 220 may be provided in a mesh form. When the sensing electrode 200 has a mesh form, a pattern of the sensing electrode 200 may be invisible in the effective area AA. Even when the sensing electrode 200 is formed of a metal, the pattern of the sensing electrode 200 may be invisible. Even when the sensing electrode 200 is applied to a touch-sensing apparatus 1000A having a large size, a resistance of the touch-sensing apparatus 1000A may be reduced. The sensing electrode 200 and the wiring electrode 300 may be patterned at a same time using the same material.

The wiring electrode 300 may be provided in at least one area of the effective area AA or the non-effective area UA of the substrate 100. For example, as illustrated in FIG. 1, the wiring electrode 300 may be provided in the non-effective area UA of the substrate 100. The wiring electrode 300 may include a first wiring electrode 310 and a second wiring electrode 320, which may be provided in the non-effective area UA of the substrate 100.

The first wiring electrode 310 may include one end connected to the first sensing electrode 210, and the second wiring electrode 320 may include one end connected to the second sensing electrode 220. Another end of each of the first wiring electrode 310 and the second wiring electrode 320 may be connected to a circuit board. The circuit board may be any one of various shapes of circuit boards, and, for example, may be a flexible printed circuit board (FPCB). Each of the first wiring electrode 310 and the second wiring electrode 320 may include a conductive material. For example, the wiring electrode 300 may include a material that is the same as, similar to, or different from that of the above-described sensing electrode 200.

The decorative layer 400 may be provided on the substrate 100. The decorative layer 400 may be provided in the non-effective area UA of the substrate 100. Embodiments 400A, 400B, 400C, 400D, and 400E of the decorative layer 400 are described later with reference to FIG. 3 to FIG. 8.

The fingerprint sensor 500 may be provided on the substrate 100. For example, the decorative layer 400 may be provided on the substrate 100, and the fingerprint sensor 500 may be provided on the decorative layer 400. The fingerprint sensor 500 may be classified as an ultrasonic-type, infrared-type, or capacitive-type fingerprint sensor according to a principle of operation thereof. The fingerprint sensor 500 may perform a predetermined function, for example, when a touch subject approaches or touches one surface of the touch-sensing apparatus 1000A.

FIG. 3 through FIG. 8 illustrate various embodiments 400A, 400B, 400C, 400D, and 400E of the decorative layer 400, but the embodiments are not limited thereto. As long as a configuration may be implemented so that the first decorative layer 410A to 410D provided on the bottom surface 100c of the cavity portion C have at least one groove H and the second decorative layer 420A to 420E is provided in the groove H, the first decorative layer 410A to 410D and the second decorative layer 420A to 420E may have various cross-sectional configurations different from those shown in FIG. 3 to FIG. 8.

The substrate 100 may include first and second surfaces 100a and 100b. The first surface 100a may be defined as a surface that a touch subject touches, and the second surface 100b may be defined as a surface opposite to the first surface 100a. The first surface 100a may be the upper surface of the substrate 100, and the second surface 100b may be the lower surface of the substrate 100. For example, although the total thickness TT of the substrate 100 may be 250 μm to 300 μm, embodiments are not limited thereto.

The substrate 100 may include the cavity portion C formed in the non-effective area UA of the first or second surface 100a or 100b. For example, as illustrated in FIG. 3 to FIG. 8, although the cavity portion C may be formed in the non-effective area UA of the second surface 100b of the substrate 100, embodiments are not limited thereto. The second surface 100b of the substrate 100, which may be provided with the cavity portion C, may be stepped, whereas the first surface 100a of the substrate 100 may be a flat surface having no stepped portion. Alternatively, a cavity portion having a shape similar to the cross-sectional shape formed on the second surface 100b may be additionally formed on the first surface 100a.

The cavity portion C may be provided at the lower side of the effective area AA, at the upper side of the effective area AA, or at the lateral side of the effective area AA, within the non-effective area UA of the substrate 100. For example, as illustrated in FIG. 2, the cavity portion C may be provided at the lower side of the effective area AA within the non-effective area UA.

A side surface 100d1 or/and 100d2 of the cavity portion C may be inclined at a predetermined angle θ relative to a virtual vertical plane that is parallel to a thickness direction of the substrate 100 (e.g. the x-axis direction), but embodiments are not limited to a specific value of the angle θ. The side surface of the cavity portion C may be a flat surface 100d1 as illustrated in FIG. 3, FIG. 4, FIG. 5, FIG. 6, or FIG. 8, or may be a curved surface 100d2 as illustrated in FIG. 7. The side surface 100d1 of the cavity portion C illustrated in FIG. 3, FIG. 4, FIG. 5, FIG. 6, or FIG. 8 may be replaced with the curved surface 100d2 as illustrated in FIG. 7, or the side surface 100d2 of the cavity portion C illustrated in FIG. 7 may be replaced with the flat surface 100d1 illustrated in FIG. 3, FIG. 4, FIG. 5, FIG. 6, or FIG. 8.

The cavity portion C may have any of various shapes, such as, e.g., a polygonal shape or a circular shape. For example, although the cavity portion C may have a rectangular plan shape as illustrated in FIG. 2, embodiments are not limited thereto.

The decorative layer 400 (400A to 400E) may serve to prevent at least one of the wiring electrode 300 provided in the non-effective area UA, the printed circuit board that connects the wiring electrode 300 to an external circuit, or the fingerprint sensor 500 from being visible from the outside. The decorative layer 400 (400A to 400E) may play a role of marking the 'shape' in the non-effective area UA of the touch-sensing apparatus 1000A. For example, the shape marked by the decorative layer 400 (400A to 400E) may be an effect of various decorations such as, e.g., lines, figures, hairline shape, and weave patterns, or logos, for example, including shapes such as symbols, numbers, and characters. But, embodiments are not limited to the specific type of 'shape.' Although such a shape is not shown in FIG. 1 and FIG. 2, various shapes, for example, shown in FIG. 9A and FIG. 9B may be marked by the decorative layers 400 (400A to 400E).

The decorative layer 400 (400A to 400E) may be manufactured by an evaporation method instead of a printing method. Thus, even when the substrate 100 is flexible or includes a curved surface, the decorative layer 400 (400A to 400E) may be easily formed in and around the cavity portion C.

Figure 3:
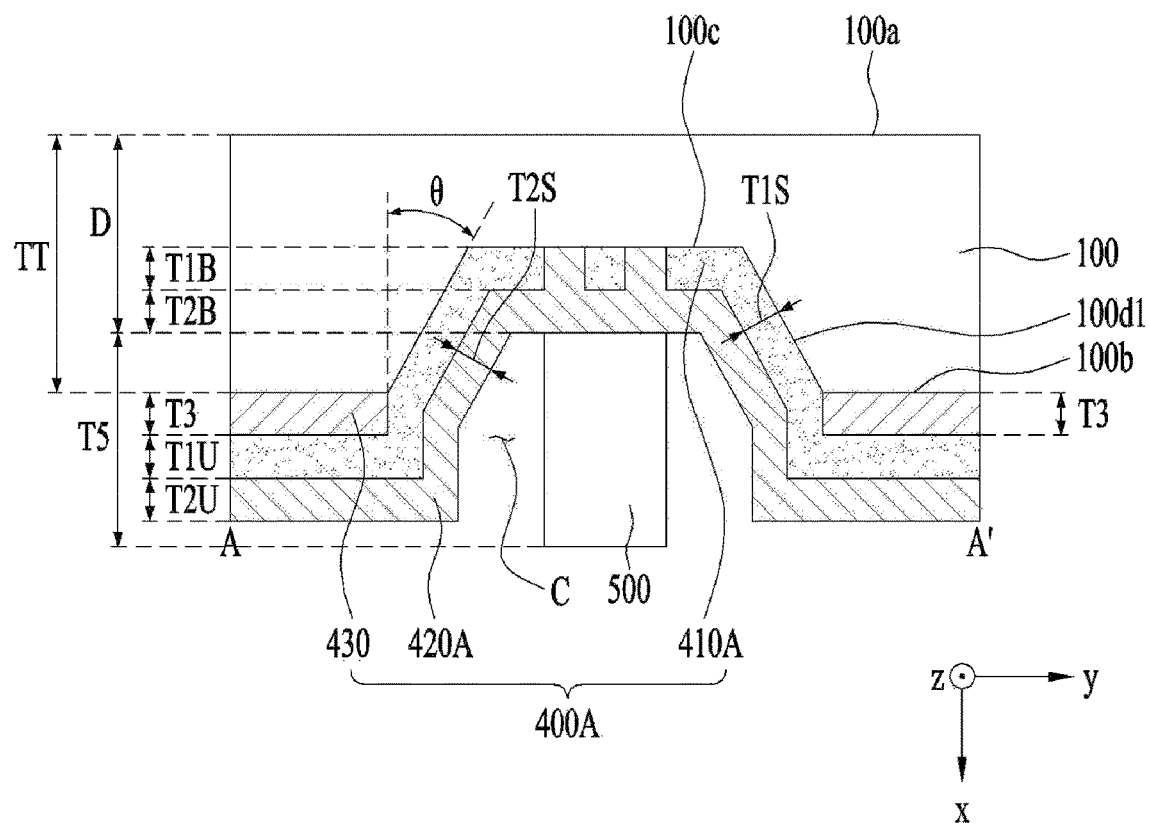
FIG. 3 is a cross-sectional view taken along line A-A' of FIG. 2 of the tough-sensing apparatus.
Figure 4:
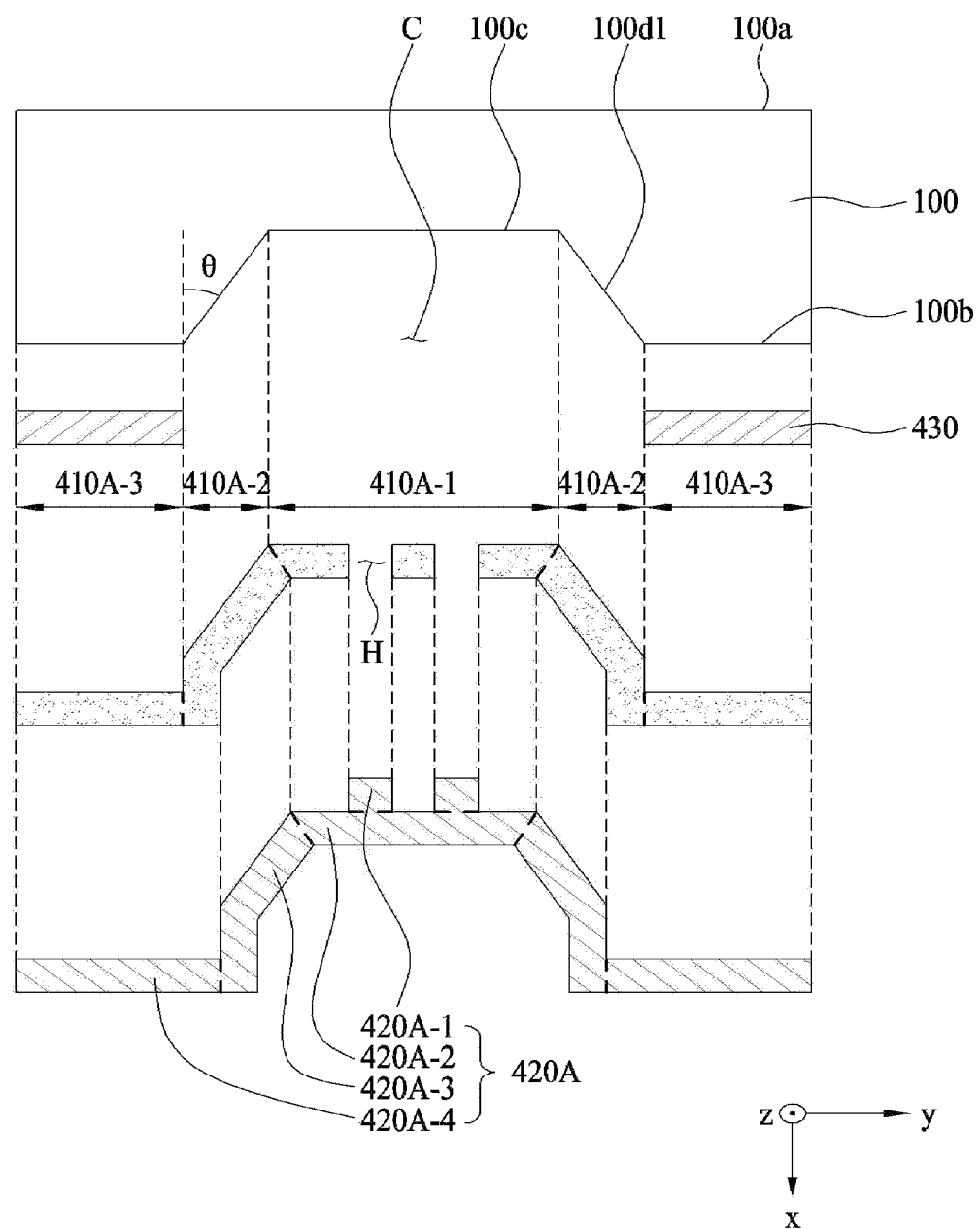
FIG. 4 is an exploded view of the touch-sensing apparatus shown in FIG. 3.
Figure 5:
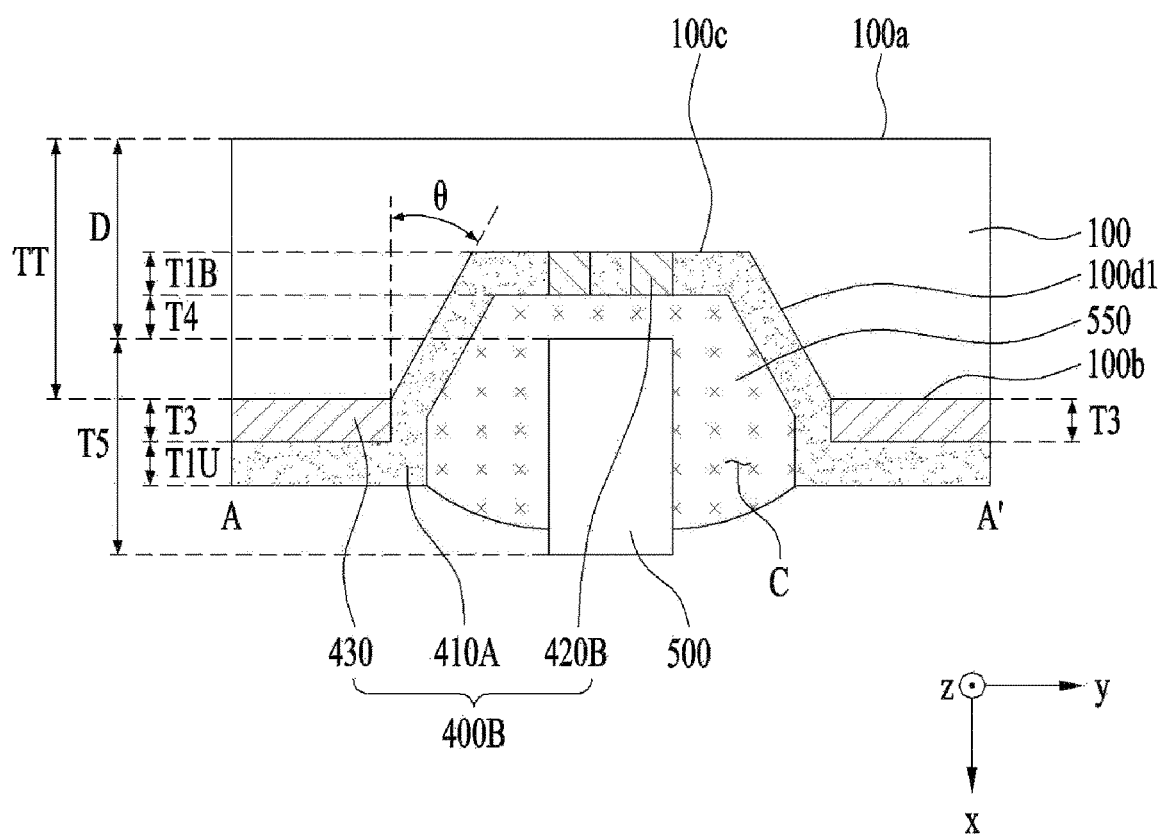
FIG. 5 is a cross-sectional view taken along line A-A' of FIG. 2 of a touch-sensing apparatus according to another embodiment.
Figure 6:
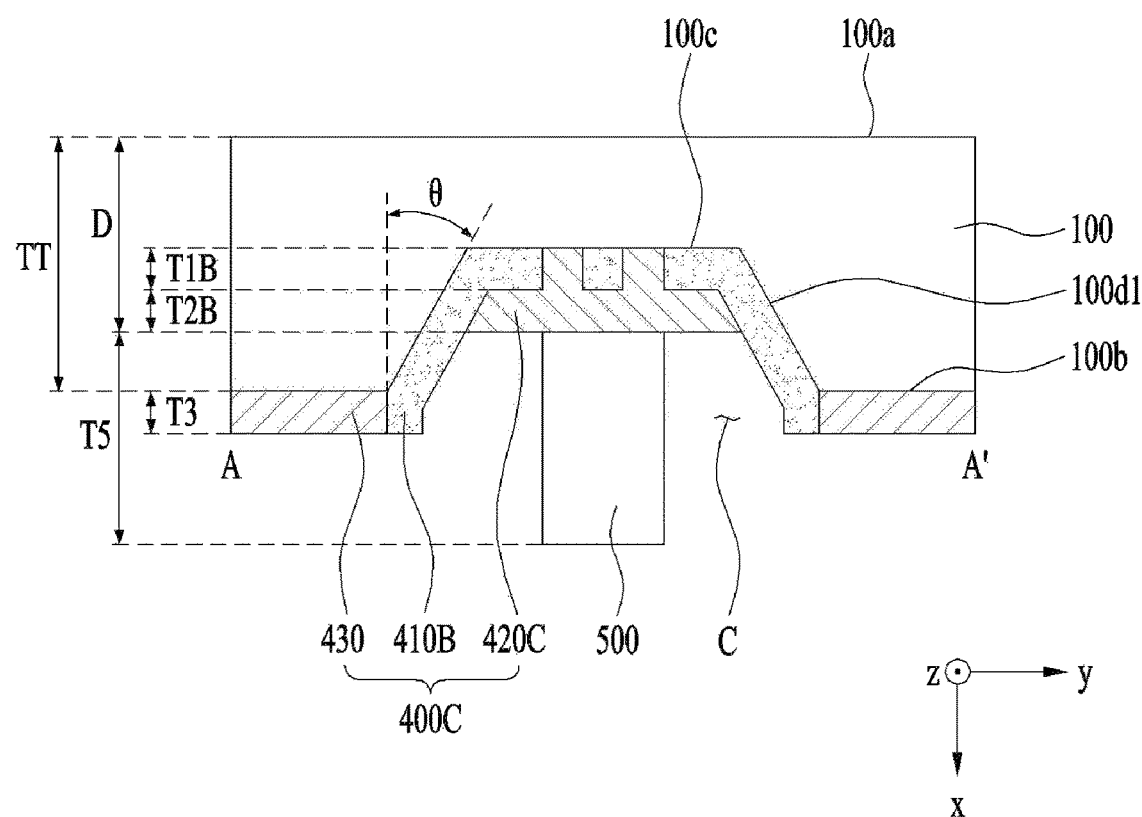
FIG. 6 is a cross-sectional view taken along line A-A' of FIG. 2 of a touch-sensing apparatus according to still another embodiment.
Figure 7:
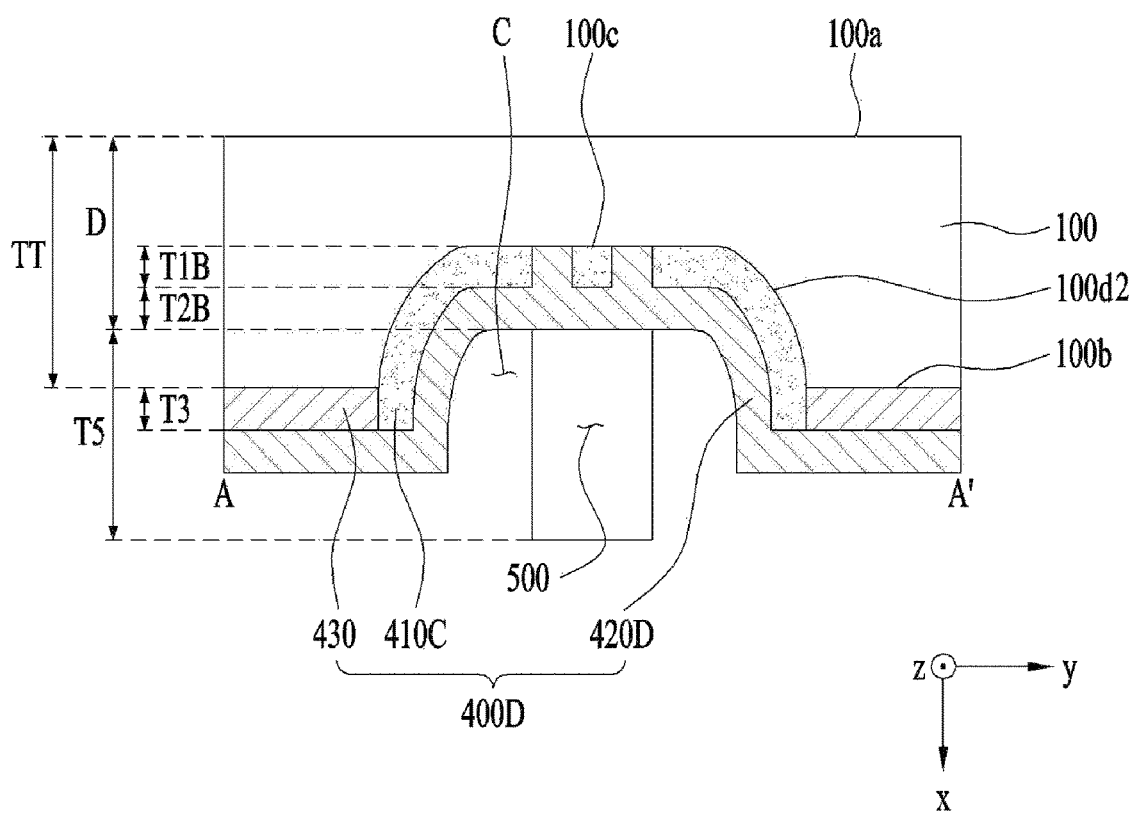
FIG. 7 is a cross-sectional view taken along line A-A' of FIG. 2 of a touch-sensing apparatus according to still another embodiment.

Referring to FIG. 3 to FIG. 8, the decorative layer 400A to 400E may include a first decorative layer 410A, 410B, 410C, or 410D, a second decorative layer 420A, 420B, 420C, 420D, or 420E, and a third decorative layer 430. The first decorative layer 410A, 410B, 410C, or 410D may be provided inside the cavity portion C, which may be formed in the non-effective area UA of the substrate 100. As illustrated in FIG. 3, FIG. 4, or FIG. 5, the first decorative layer 410A may be provided at the outside of the cavity portion C. Regardless of whether the first decorative layers 410A, 410B, 410C, and 410D are provided only inside the cavity portion C or while extended outwardly, the first decorative layers 410A to 410D may have at least one groove H that exposes the bottom surface 100c of the cavity portion C according to an embodiment.

Referring to FIG. 3 and FIG. 4, the first decorative layer 410A may be provided on the bottom surface 100c and the side surface 100d1 of the cavity portion C, and the third decorative layer 430 provided at the periphery of the cavity portion C on the second surface 100b of the substrate 100. The first decorative layer 410A may include a (1-1) decorative layer 410A-1, a (1-2) decorative layer 410A-2, and a (1-3) decorative layer 410A-3.

The (1-1) decorative layer 410A-1 may be provided on the bottom surface 100c of the cavity portion C and may have at least one groove H therein. The (1-2) decorative layer 410A-2 may be provided to extend from the (1-1) decorative layer 410A-1 to the side surface 100d1 of the cavity portion C. The (1-3) decorative layers 410A-3 may be provided to extend from the (1-2) decorative layer 410A-2 to the upper portion of the third decorative layer 430.

Although the first decorative layer 410A may be formed on the bottom surface 100c, the side surface 100d, and the third decorative layer 430 of the cavity portion C as shown in FIG. 3, FIG. 4, and FIG. 5, the embodiments are not limited thereto. As shown in FIG. 6 and FIG. 7, the first decorative layers 410B and 410C may be provided only on the bottom surface 100c and the side surfaces 100d1 and 100d2 of the cavity portion C, but may not be provided on the third decorative layer 430. Each of the first decorative layers 410B and 410C shown in FIGS. 6 and 7 may include only the (1-1) and (1-2) decorative layers 410A-1 and 410A-2. The (1-2) decorative layer 410A-2 may have a flat cross-sectional shape as shown in FIG. 6 or a curved cross-sectional shape as shown in FIG. 7. In FIG. 3, FIG. 5 and FIG. 6, since the side surface 100d1 of the cavity portion C is a flat surface, the (1-2) decorative layer 410A-2 may have a flat cross-sectional shape. In FIG. 7, since the side surface of the cavity portion C is curved, the (1-2) decorative layer 410A-2 may have a curved cross-sectional shape.

Figure 8:
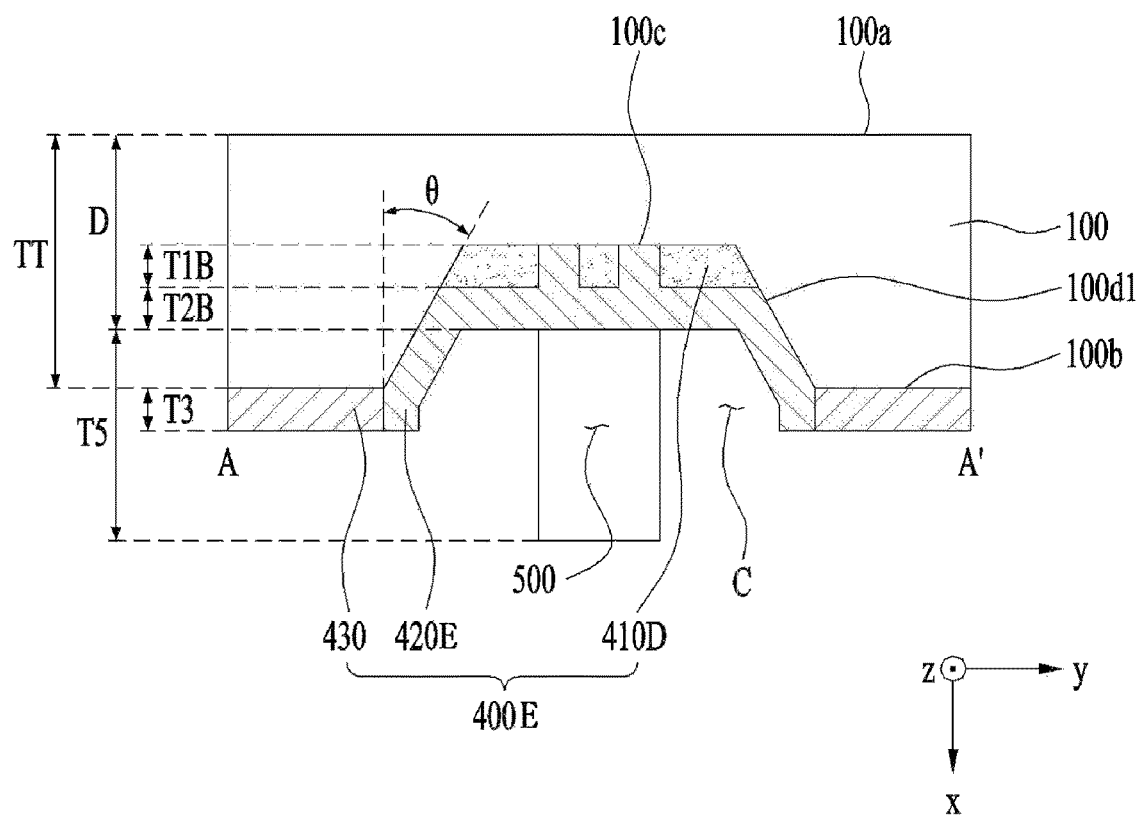
FIG. 8 is a cross-sectional view taken along line A-A' of FIG. 2 of a touch-sensing apparatus according to still another embodiment.

As shown in FIG. 8, the first decorative layer 410D may be provided only on the bottom surface 100c of the cavity portion C but may be provided on neither the side surface 100d1 of the cavity portion C nor the upper portion of the third decorative layer 430. The first decorative layer 410D shown in FIG. 8 may include only the first decorative layer 410A-1. Planar shapes of the first decorative layers 410A to 410D provided in the cavity portion C illustrated in FIG. 2 may be ring-shaped, but embodiments are not limited thereto.

The second decorative layers 420A to 420E may be provided within the grooves H of the first decorative layers 410A to 410D. The second decorative layers 420A to 420E may be provided on at least one of the (1-1) decorative layer 410A-1 provided on the bottom surface 100c of the cavity portion C, the side surfaces 100d1 and 100d2 of the cavity portion C, or the upper surface of the third decorative layer 430.

As illustrated in FIG. 3, FIG. 4, or FIG. 7, each of the second decorative layers 420A and 420D may include all of (2-1), (2-2)$^{th}$, (2-3)$^{th}$, and (2-4)$^{th}$ decorative layers 420A-1, 420A-2, 420A-3, and 420A-4. The (2-1) decorative layer 420A-1 may be provided inside the groove H formed within the (1-1) decorative layer 410A-1. The (2-2) decorative layer 420A-2 may be provided on the (2-1) decorative layer 420A-1 and the (1-1) decorative layer 410A-1. The (2-3) decorative layer 420A-3 may be provided to extend from the (2-2) decorative layer 420A-2 to the upper portion of the (1-2) decorative layer 410A-2 provided on the side surfaces 100d1 and 100d2 of the cavity portion C. The (2-4) decorative layer 420A-4 may be provided to extend from the (2-3) decorative layer 420A-3 to the upper portion of the third decorative layer 430. The (2-3) decorative layer 420A-3 of the second decorative layer 420A shown in FIG. 3 and FIG. 4 may have a flat cross-sectional shape, but the (2-3) decorative layer 420D-3 of the second decorative layer 420D shown in FIG. 7 may have a curved cross-sectional shape.

As shown in FIG. 5, the second decorative layer 420B may include only the (2-1) decorative layer 420A-1 provided inside the groove H of the (1-1) decorative layer 410A-1. As illustrated in FIG. 6, the second decorative layer 420C may be provided inside the groove H of the (1-1) decorative layer 410A-1 and on the (1-1) decorative layer 410A-1, and on the (2-1) decorative layer 420A-1. In other words, the second decorative layer 420C may include only the (2-1) decorative layer 420A-1 and the (2-2) decorative layer 420A-2. As illustrated in FIG. 8, the second decorative layer 420E may include only the (2-1), (2-2), and (2-3) decorative layers 420A-1, 420A-2, and 420A-3.

As long as the first decorative layer 410A includes the (1-1) decorative layer 410A-1 and the second decorative layer 420A includes the (2-1) decorative layer 420A-1, the embodiments are not limited to specific cross-sectional shapes of the first decorative layers 410A to 410D and the second decorative layers 420A to 420E. Thus, various combinations of the (1-2) and (1-3) decorative layers 410A-2 and 410A-3 and the (2-2) to (2-4) decorative layers 420A-2 to 420A-4 may be possible. On the other hand, as illustrated in FIG. 2, the third decorative layer 430 may be provided in a portion other than the cavity portion C in the non-effective area UA, that is, in the periphery of the cavity portion C.

Thicknesses of the first decorative layers 410A to 410D, the second decorative layers 420A to 420E, and the third decorative layer 430 may be as follows. A (1-1) thickness T1B of the (1-1) decorative layer 410A-1 provided on the bottom surface 100c of the cavity portion C, a (1-2) thickness T1S of the (1-2) decorative layer 410A-2 provided on the side surface 100d1 of the cavity portion C, and a (1-3) thickness T1U of the (1-3) decorative layer 410A-3 provided on the third decorative layer 430 may be different from each other or may be identical to each other. For example, the (1-1) thickness T1B may be thicker than the (1-2) thickness T1S, but the embodiments are not limited thereto.

Since the (1-1) decorative layer 410A-1 may be formed by the evaporation method, the (1-1) decorative layer 410A-1 may be formed thinner than the second decorative layers 420A to 420E, for example, a very thin thickness of tens of nanometers. Each of the (1-1) thickness T1B, the (1-2) thickness T1S, and the (1-3) thickness T1U may be 40 nm to 70 nm, for example 40 nm to 60 nm, but embodiments are not limited thereto.

Since the (2-1) decorative layer 420A-1 is provided in the groove H of the (1-1) decorative layer 410A-1 provided on the bottom surface 100c of the cavity portion C, the (2-1) thickness T1B of the (2-1) decorative layer 420A-1 may be the same as the (1-1) thickness T1B of the (1-1) decorative layer 410A-1. The (2-2) thickness T2B of the (2-2) decorative layer 420A-2 and the (2-3) thickness T2S of the (2-3) decorative layer 420A-3 provided on the side surface 100d1 of the cavity portion C, and the (2-4) thickness T2U of the (2-4) decorative layer 420A-4 provided on the upper portion of the third decorative layer 430 may be different from each other or may be identical to each other. For example, the (2-2) thickness T2B may be thicker than the (2-3) thickness T2S, but the embodiments are not limited thereto.

A third thickness T3 of the third decorative layer 430 provided in the periphery of the cavity portion C may be different from or identical to each of the (1-1), (1-2), (1-3), (2-1), (2-2), (2-3), and (2-4) thicknesses T1B, T1S, T1U, T1B, T2B, T2S, and T2U. For example, each of the (2-2), (2-3), and (2-4) thicknesses T2B, T2S, and T2U of the second decorative layers 420A to 420E may 2 μm to 14 μm, for example, 10 μm, but embodiments are not limited thereto. The (1-1) thickness T1B (or, the (2-1) thickness) may be smaller than each of the (2-2), (2-3) and (2-4) thicknesses T2B, T2S, and T2U, but may be identical to the third thickness T3.

The first decorative layers 410A to 410D may include at least one oxide layer and at least one metal layer. For example, the at least one oxide may include at least one of titanium dioxide ($TiO_2$), silicon dioxide ($SiO_2$), aluminum oxide ($Al_2O_3$), hafnium oxide ($HfO_2$), zinc oxide (ZnO), magnesium oxide (MgO), cesium oxide ($Ce_2O_3$), Indium oxide ($In_2O_3$), indium tin oxide (ITO), or barium titanate ($BaTiO_3$), but the embodiments are not limited thereto. For example, the at least one metal layer may include at least one of indium (In), tin (Sn), aluminum (Al), silver (Ag), nickel (Ni), chromium (Cr), platinum (Pt), molybdenum (Mo), Copper (Cu), or gold (Au), or an alloy thereof, but the embodiments are not limited thereto.

Constituent materials of the second decorative layers 420A to 420E and the third decorative layer 430 may be identical to or different from each other. If the second decorative layers 420A to 420E and the third decorative layer 430 are formed of the same or similar color, the non-effective area UA may have a sense of unity. Alternatively, when the second decorative layers 420A to 420E and the third decorative layer 430 are different colors, an area where the fingerprint sensor 500 is provided may be easily identified by color deviation when viewed from the outside.

For example, each of the second decorative layers 420A to 420E and the third decorative layer 430 may be formed by applying a material having a predetermined color. Each of the second decorative layers 420A to 420E and the third decorative layer 430 may have a desired color. Each of the second decorative layers 420A to 420E and the third decorative layer 430 may represent black or white by having black or white pigment and the like. Alternatively, each of the second decorative layers 420A to 420E and the third decorative layer 430 may implement various colors such as, e.g., white, black, red, and blue using a film or the like.

The first decorative layers 410A to 410D may serve to more easily distinguish the area where the fingerprint sensor 500 is provided, that is, the cavity portion C in which the first decorative layers 410A to 410D are provided. The (1-1) and (2-1)$^{th}$ decorative layers 410A-1 and 420A-1 may also serve to provide various 'shapes' when viewed from the outside.

Figure 9A:
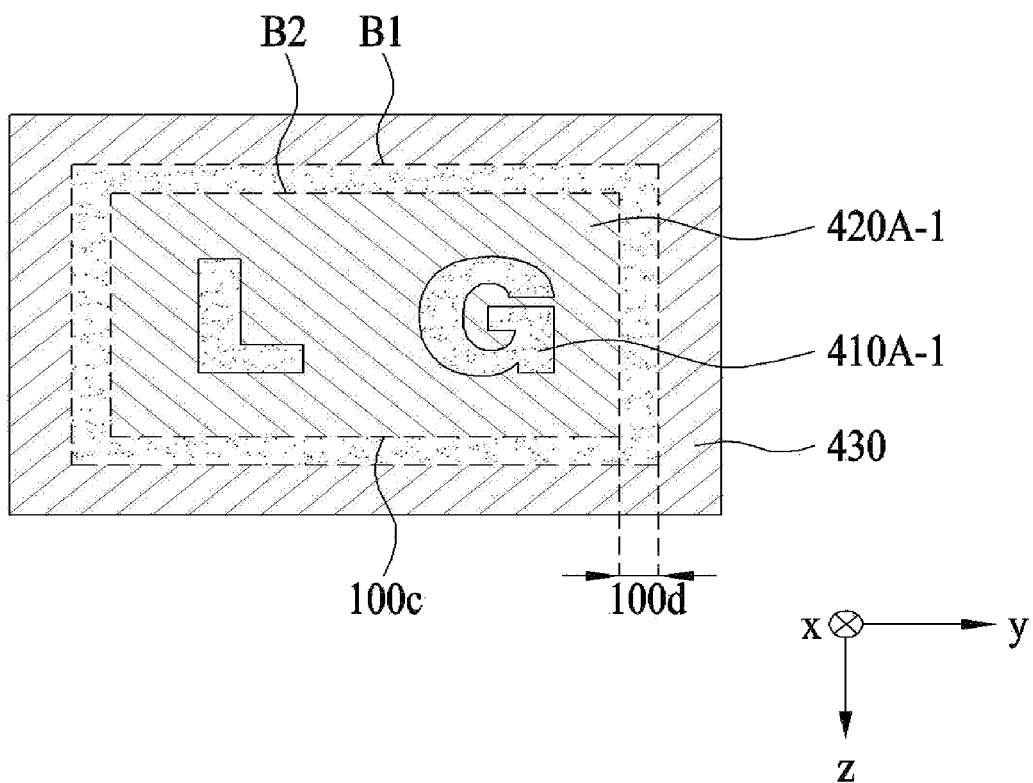
FIG. 9A and FIG. 9B illustrate external views of (1-1) decorative layer of a first decorative layer and a (2-1) decorative layer of a second decorative layer.
Figure 9B:
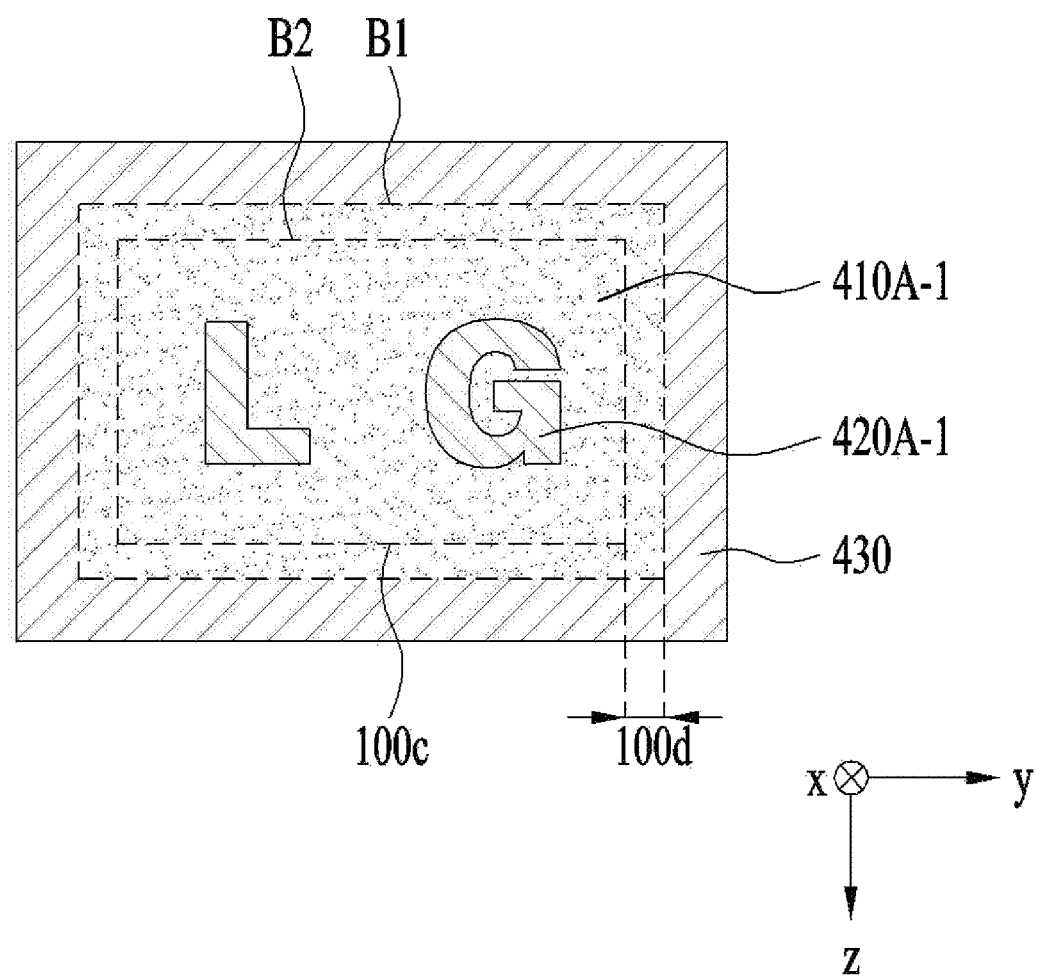

FIG. 9A and FIG. 9B illustrate shapes that may be visible externally by the (1-1) and (2-1) decorative layers 410A-1 and 420A-1. The first box B1 and the second box B2 correspond to B1 and B2 shown in FIG. 2, respectively. Although the shape is not shown in the second box B2 shown in FIG. 2, for example, a shape as shown in FIG. 9A or FIG. 9B may be marked. In FIG. 9A and FIG. 9B, reference numeral 100d may be the side walls 100d1 and 100d2 of the cavity portion C shown in FIG. 3 to FIG. 8. For convenience of explanation, the 'shape' or logo shown in FIG. 9A and FIG. 9B is 'LG.'

As illustrated in FIG. 9A, the (2-1) decorative layer 420A-1 embedded in the groove H formed in the (1-1) decorative layer 410A-1 may correspond to a background of the shape 'LG' viewed from the outside of the touch-sensing apparatus 1000A, and the (1-1) decorative layer 410A-1 having the groove H, that is the (1-1) decorative layer 410A-1 in the vicinity of the groove H may correspond to the shape itself 'LG.'

As illustrated in FIG. 9B, the groove H formed in the 1-1 decorative layer 410A-1 may correspond to a shape itself of 'LG' viewed from the outside of the touch-sensing apparatus 1000A, and the (1-1) decorative layer 410A-1 having the groove H, that is the (1-1) decorative layer 410A-1 in the vicinity of the groove H may correspond to the background of the shape 'LG.'

The fingerprint sensor 500 may be provided on the first decorative layers 410A to 410D and the second decorative layers 420A to 420E provided on the bottom surface 100c of the cavity portion C. In FIG. 3, FIG. 6, FIG. 7, and FIG. 8, since the (1-1), the (2-1), and (2-2) decorative layers 410A-1, 420A-1, and 420A-2 are provided on the bottom surface 100c of the cavity portion C, the fingerprint sensor 500 may also be provided on the (2-2) decorative layer 420A-2 formed on the bottom surface 100c of the cavity portion C.

Alternatively, as shown in FIG. 5, the touch-sensing device 1000A may further include a first adhesive layer 550. The first adhesive layer 550 may be provided between the fingerprint sensor 500 and at least one of the bottom surface 100c or the side surface 100d1 of the cavity portion C. For example, the first adhesive layer 550 may include first and second adhesive portions. The first adhesive portion may be a portion provided between the bottom surface 100c of the cavity portion C and the fingerprint sensor 500 in the first adhesive layer 550. The second adhesive portion may extend from the first adhesive portion and may correspond to a portion provided between the side surface 100d1 of the cavity portion C and the fingerprint sensor 500.

If the (1-1) decorative layer 410A-1 and the (2-1) decorative layer 420A-1 are arranged between the bottom surface 100c of the cavity portion C and the fingerprint sensor 500 as shown in FIG. 5, the first adhesive portion may be provided between the fingerprint sensor 500 and both of the (1-1) and (2-1) decorative layers 410A-1 and 420A-1. In addition, when the (1-2) decorative layer 410A-2 is provided between the side surface 100d1 of the cavity portion C and the fingerprint sensor 500, the second adhesive portion may be provided between the (1-2) decorative layers 410A-2 and the fingerprint sensor 500.

Even if the first decorative layers 410A, 410B, 410C, and 410D and the second decorative layers 420A, 420C, 420D, and 420E are implemented as shown in FIG. 3, FIG. 6, FIG. 7, or FIG. 8, the first adhesive layer 550 shown in FIG. 5 may be provided between at least one of the fingerprint sensor 500 and the first decorative layer 410A, 410B, 410C, or 410D or between the fingerprint sensor 500 and the second decorative layer 420A, 420C, 420D, or 420E.

If a fourth thickness L4 of the first adhesive layer 550 is smaller than 10 μm, an adhesive force of the first adhesive layer 550 may decrease. When the fourth thickness L4 is larger than 40 μm, a distance D between the fingerprint sensor 500 and the first surface 100a of the substrate 100 may increase so that the sensing sensitivity of the fingerprint sensor 500 may lower. Therefore, the fourth thickness L4 of the first adhesive layer 550 may be 10 μm to 40 μm, but the embodiments are not limited thereto. The first adhesive layer 550 may be formed of a material having an adhesive force such as resin, but the embodiments are not limited to the specific material of the first adhesive layer 550.

When the first adhesive layer 550 is provided as described above, the fingerprint sensor 500 may be firmly attached to the first decorative layers 410A to 410D or the second decorative layers 420A to 420E so that a possibility that the fingerprint sensor 500 is separated by external impact may be reduced, thereby being capable of improving the reliability of the touch-sensing apparatus 1000A. The fingerprint sensor 500 may be provided on a plane portion which may be a central region within the cavity portion C, but the embodiments are not limited to a specific position in which the fingerprint sensor 500 may be provided.

When a fifth thickness T5 of the fingerprint sensor 500 is thick or the depth of the cavity portion C is shallow, only a part of the fingerprint sensor 500 may be provided in the inside of the cavity portion C as shown in FIG. 3 to FIG. 8. The fifth thickness T5 of the fingerprint sensor 500 may be, for example, 830 μm, but the embodiments are not limited thereto. Alternatively, when the fifth thickness T5 of the fingerprint sensor 500 is thin or the depth of the cavity portion C is deep, the fingerprint sensor 500 may be provided wholly inside the cavity portion C unlike FIG. 3 to 8.

Hereinafter, a manufacturing method of the touch-sensing apparatus 1000A according to an above-described embodiment shown in FIG. 3 is described with reference to the accompanying drawings. Although only a manufacturing method of the touch-sensing apparatus 1000A shown in FIG. 3 is described, the touch-sensing apparatuses 1000A shown in FIG. 5 to FIG. 8 may be manufactured by modifying the manufacturing method described below. The touch-sensing apparatus 1000A shown in FIG. 3 may be manufactured by other manufacturing methods without being limited by the manufacturing method described below.

FIG. 10A to FIG. 10F are cross-sectional views that illustrate a manufacturing method of the touch-sensing apparatus 1000A shown in FIG. 3. Referring to FIG. 10A, a substrate 100 may be prepared. Referring to FIG. 10B, a cavity portion C may be formed in the prepared substrate 100. A strength of the bottom surface 100c of the cavity portion C and the first surface 100a of the substrate 100 may be weakened when a depth of the cavity portion C is too deep. Considering that, the cavity portion C may be formed. Referring to FIG. 10C, a third decorative layer 430 may be formed in a periphery of the cavity portion C in the non-effective area UA around the effective area AA of the substrate 100.

Referring to FIG. 10D, a first decorative layer 410 may be formed on the bottom surface 100c of the cavity portion C, the upper portion of the third decorative layer 430, and the side surface 100d1 of the cavity portion C by evaporation method. Referring to FIG. 10E, a groove H may be formed in the first decorative layer 410 provided on the bottom surface 100c of the cavity portion C. For example, the groove H may be formed by irradiating a laser or the like to the first decorative layer 410. Referring to FIG. 10F, a second decorative layer 420A may be formed on the first decorative layer 410A while filling the groove H of the first decorative layer 410A. Referring to FIG. 3, the fingerprint sensor 500 may be provided on the first and second decorative layers 410A and 420A.

Figure 11:
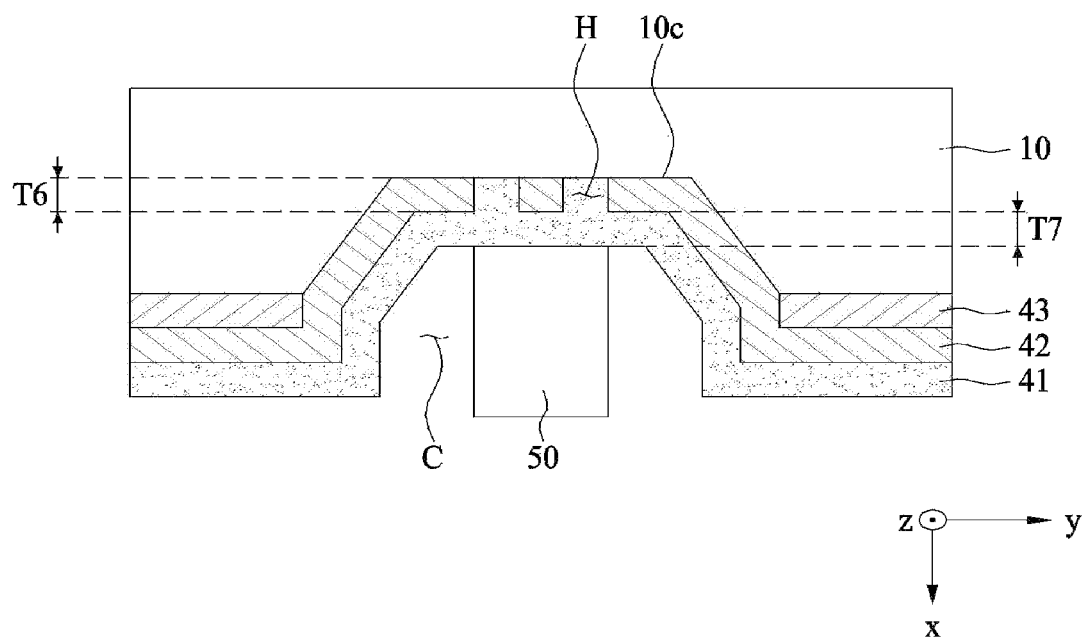
FIG. 11 is a cross-sectional view of a touch-sensing device according to a comparative example.

FIG. 11 is a cross-sectional view of a touch-sensing apparatus according to a comparative example. The touch-sensing apparatus according to the comparative example shown in FIG. 11 may be composed of a substrate 10, a first decorative layer 41, a second decorative layer 42, a third decorative layer 43, and a fingerprint sensor 50. The substrate 10 and the fingerprint sensor 50 shown in FIG. 11 may perform a same role as the substrate 100 and the fingerprint sensor 500 shown in FIG. 3, respectively. In addition, as the thickness of each of the first decorative layers 410A to 410D according to the embodiment may be smaller than the thickness of each of the second decorative layers 420A to 420E, a seventh thickness T7 of the first decorative layer 41 may be thinner than a sixth thickness T6 of the second decorative layer 42 in FIG. 11.

Figure 12A:
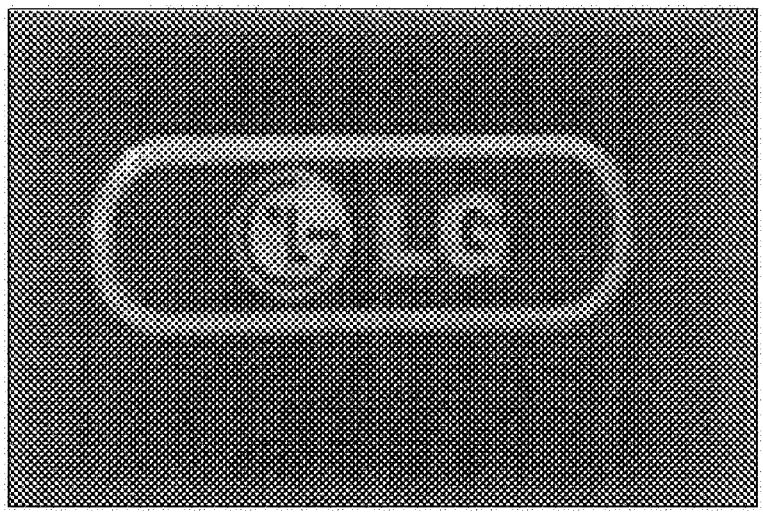
FIG. 12A shows an image of a shape formed on a bottom surface of a cavity portion in the touch-sensing device according to the comparative example.
Figure 12B:
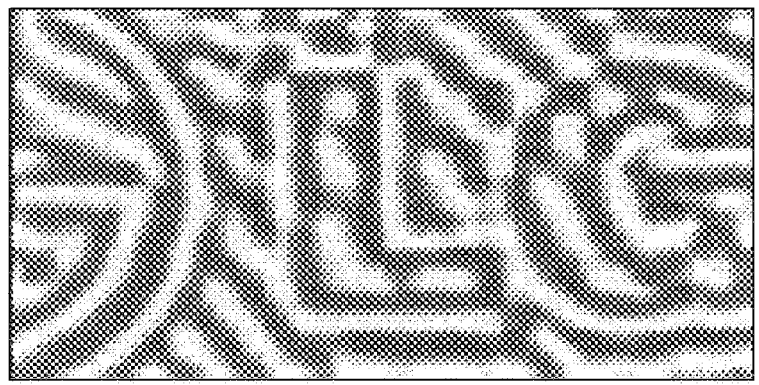
FIG. 12B shows an image corresponding to a result of sensing the image shown in FIG. 12A by a fingerprint sensor.
Figure 13A:
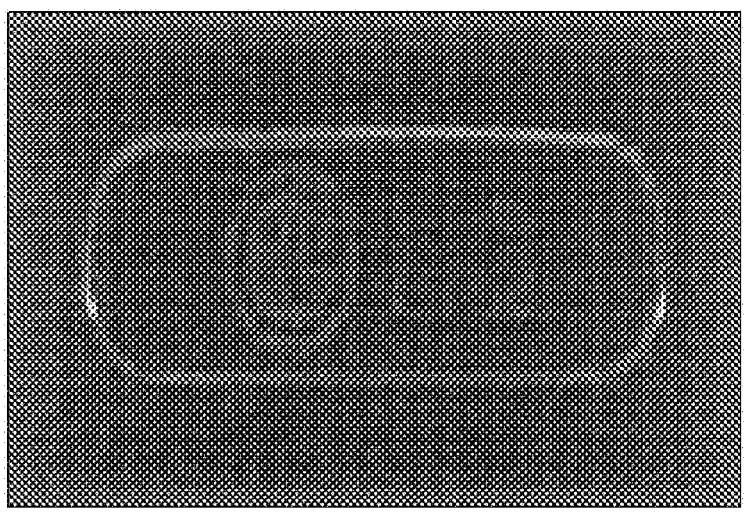
FIG. 13A shows another image of a shape formed on the bottom surface of the cavity portion in the touch-sensing device according to the comparative example.
Figure 13B:
FIG. 13B shows an image corresponding to a result of sensing the image shown in FIG. 13A by the fingerprint sensor.
Figure 14A:
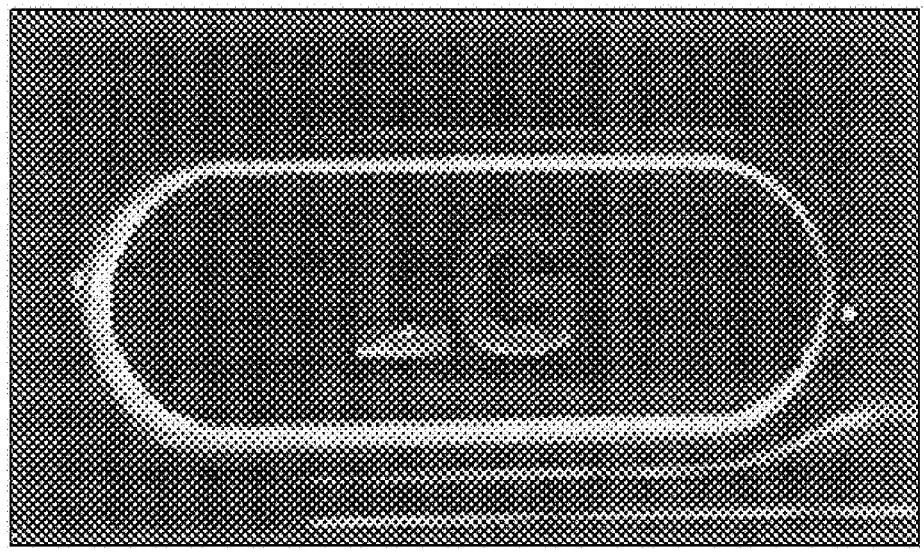
FIG. 14A shows still another image of a shape formed on the bottom surface of the cavity portion in the touch-sensing device according to the comparative example.
Figure 14B:
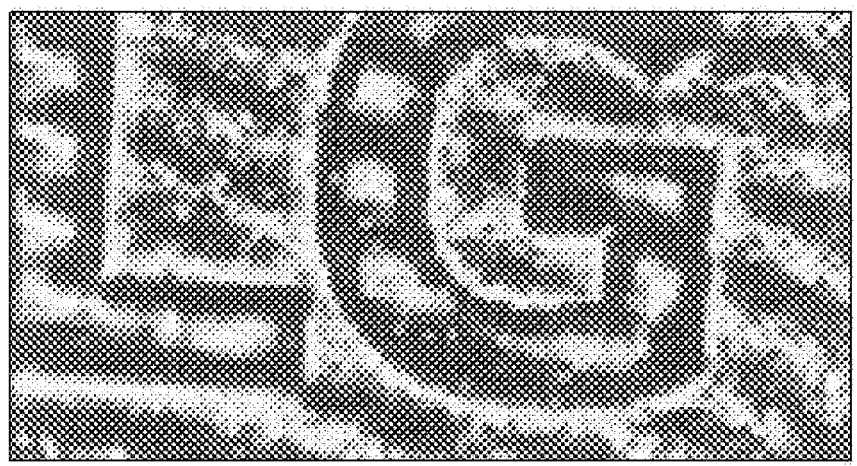
FIG. 14B shows an image corresponding to a result of sensing the image shown in FIG. 14A by the fingerprint sensor.

FIG. 12A, FIG. 13A, and FIG. 14A show images of shapes formed on the bottom surface 10c of the cavity portion C in the touch-sensing apparatus according to the comparative example, and FIG. 12B, FIG. 13B, and FIG. 14B show images corresponding to results of sensing the images shown in FIG. 12A, FIG. 13A, and FIG. 14A by the fingerprint sensor 50, respectively.

In the case of the touch-sensing apparatus according to the comparative example shown in FIG. 11, the second decorative layer 42 engraved with the grooves H may be formed on the bottom surface 10c of the cavity portion C by the printing method. After that, the first decorative layer 41 may be formed on the second decorative layer 42 and the third decorative layer 43 while burying the grooves H of the second decorative layer 42. While the sixth thickness T6 of the second decorative layer 42 may be 100 μm or less, for example, 2 μm to 5 μm as the thickness of each of the second decorative layers 420A to 420E of the embodiment, the seventh thickness T7 of the first decorative layer 41 may be several tens of nm as the thickness of each of the first decorative layers 410A to 410D according to the embodiment. Therefore, the shape may be formed by the groove H of the second decorative layer 42 having a large thickness.

Accordingly, if the image having a shape as illustrated in FIG. 12A, FIG. 13A and FIG. 14A is formed by the first decorative layer 41 embedded in the groove H and the groove H of the second decorative layer 42, the fingerprint sensor 50 may sense the image as shown in each of FIG. 12B, FIG. 13B, and FIG. 14B, together with the fingerprint. As a result, in the touch-sensing apparatus according to the comparative example, the shape and the fingerprint may be simultaneously sensed by the fingerprint sensor 50 due to a capacitance difference of an edge of the shape so that a recognition rate of the fingerprint may be lowered significantly.

Figure 15A:
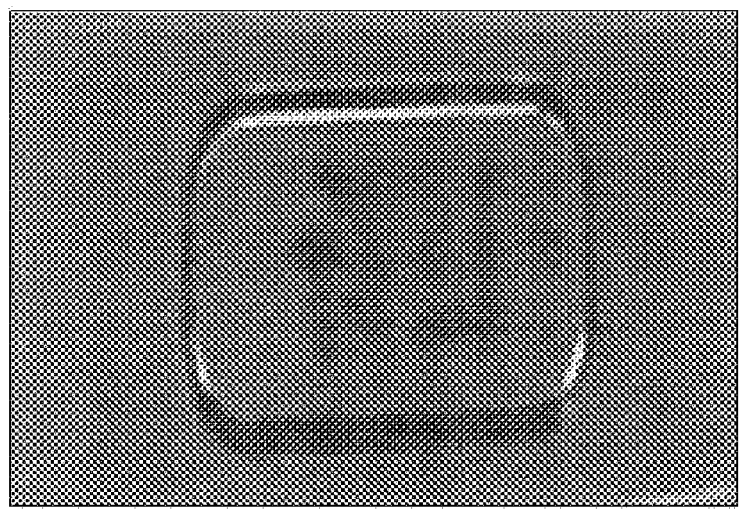
FIG. 15A shows an image of a shape formed on a bottom surface of a cavity portion in the touch-sensing apparatus according to embodiments.
Figure 15B:
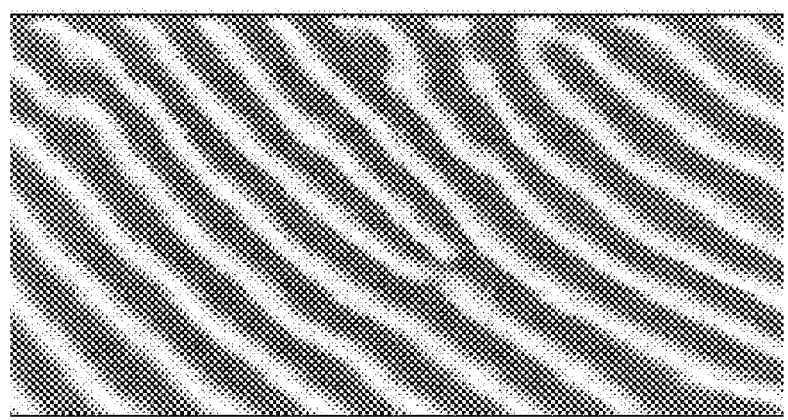
FIG. 15B shows an image corresponding to a result of sensing the image shown in FIG. 15A by a fingerprint sensor.

FIG. 15A shows an image formed on the bottom surface 100c of the cavity portion C in the touch-sensing apparatus 1000A and FIG. 15B shows an image corresponding to a result of sensing the image shown in FIG. 15A by the fingerprint sensor 500. The (1-1) decoration layer 410A-1 having the (1-1) thickness T1B, which may be thinner than the (2-2) thickness T2B of the (2-2) decoration layer 420A-2, may be first formed on the bottom surface 100c of the cavity portion C by an evaporation method, and then the (1-1) decorative layer 410A-1 may be engraved with the groove H by using a laser or the like, and then the (2-1) decorative layer 420A-1 may be embedded in the groove H. As described above, an image as shown in FIG. 15A may be made at the bottom surface 100c of the cavity portion C by the (1-1) decorative layer 410A-1 having the very thin (1-1) thickness T1B and the (2-1) decorative layer 420A-1. As shown in FIG. 15B, since the image picked up or sensed by the fingerprint sensor 500 may be an image for the fingerprint without the image for the shape, a recognition rate of the fingerprint according to the embodiment may be higher than the comparative example. For example, while a threshold value sensed by the fingerprint sensor 50 may be 1345 in the touch-sensing apparatus according to the comparative example, a threshold value sensed by the fingerprint sensor 500 in the touch-sensing apparatus 1000A may be 1447.

According to the embodiments, since the shape may not affect the fingerprint recognition rate, the touch-sensing apparatus 1000A may more variously express the shape than the touch-sensing apparatus according to the comparative example. It is assumed that, when the second decorative layer 42 is formed on the bottom surface 10c of the cavity portion C by the pad printing method, the substrate 10 and the second decorative layer 42 may have a first adhesive force or first amount of adhesion. Under this assumption, since each of the first decorative layers 410A to 410D may be first formed on the bottom surface 100c of the cavity portion C by the evaporation method, a second adhesive force or second amount of adhesion between the substrate 100 and the respective first decorative layers 410A to 410D may be higher than the first adhesive force, thereby being capable of improving adhesive force or adhesion.

As shown in FIG. 11, if either the second decorative layer 42 previously engraved with the groove H is formed in the cavity portion C by a printing method or the second decorative layer 42 having the form of a film is provided in the cavity portion C, when the first decorative layer 41 is to be embedded in the groove H, alignment may be distorted. On the other hand, in the touch-sensing apparatus 1000A, if the first decorative layer 410 not previously engraved with the groove H is first deposited on the cavity portion C as shown in FIG. 10D, and then the first decorative layer 410 is engraved with the groove H as shown in FIG. 10E, misalignment as in the comparative example may be solved. As a result, the fingerprint sensor 500 of the touch-sensing apparatus 1000A may more accurately detect the fingerprint than that of the touch-sensing apparatus according to the comparative example manufactured by the printing method.

The plan view of the touch-sensing apparatus 1000A according to the embodiment is not limited to what is illustrated in FIG. 1 and FIG. 2. That is, the touch-sensing apparatus 1000A may have any of various plan shapes so long as the substrate 100 and the decorative layers 400 (400A to 400E) have the cross-sectional structure illustrated in FIG. 3 to FIG. 8.

Various embodiments 1000B to 1000D of the touch-sensing apparatus including the above-described decorative layer 400 (400A to 400E) illustrated in FIG. 3 to FIG. 8 are described with reference to the accompanying drawings. In the touch-sensing apparatuses 1000B to 1000D described below, members or components that perform the same role as members or components included in the touch-sensing apparatus 1000A illustrated in FIG. 1 may be given the same reference numerals, and a repeated description thereof has been omitted.

Figure 16:
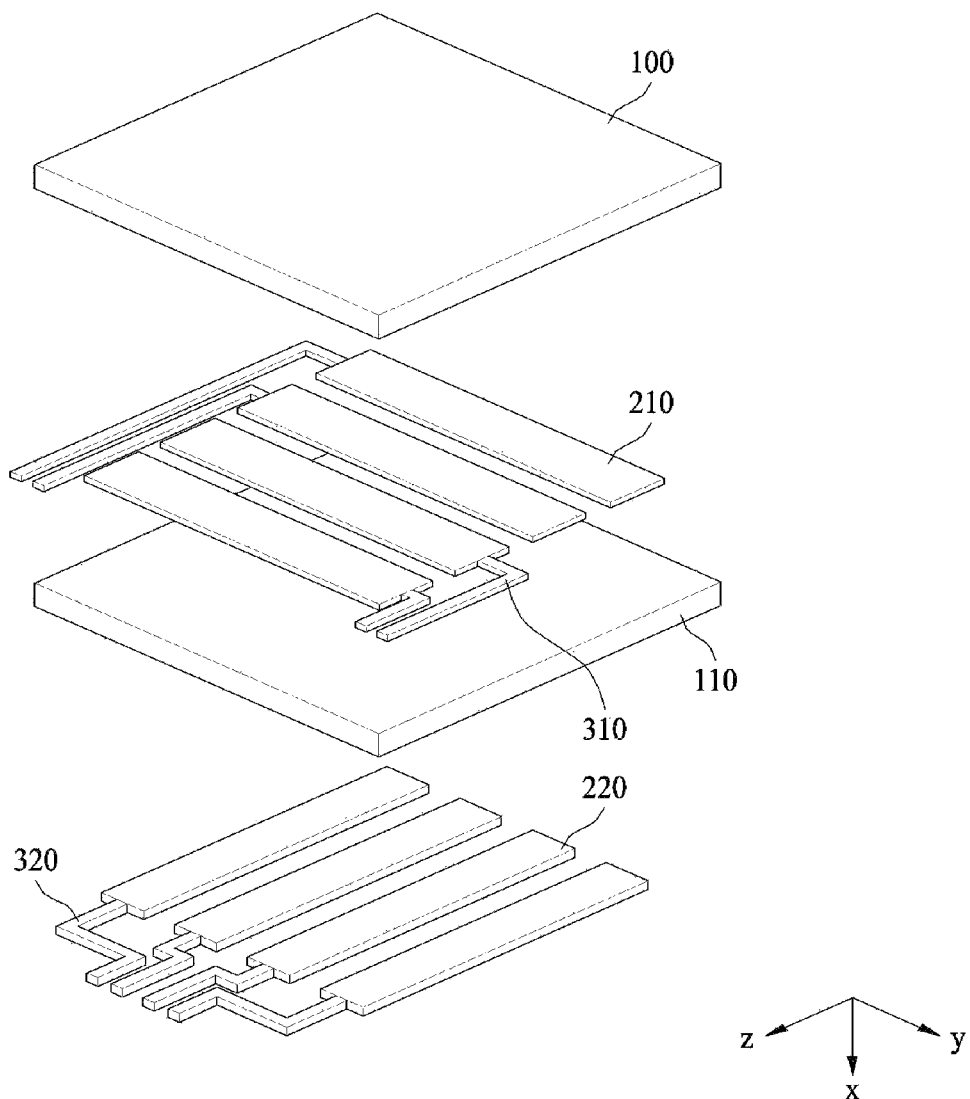
FIG. 16 is a perspective view of a touch-sensing apparatus according to another embodiment.

Referring to FIG. 16, a touch-sensing apparatus 1000B according to another embodiment may include first and second substrates 100 and 110, the first sensing electrode 210, the second sensing electrode 220, the first wiring electrode 310, and the second wiring electrode 320. The first sensing electrode 210 that extends in a given direction and the first wiring electrode 310 that is connected to the first sensing electrode 210 may be provided on one surface of the first substrate 100. The second sensing electrode 220 that extends in a direction different from the given direction, and the second wiring electrode 320 that is connected to the second sensing electrode 220 may be provided on one surface of the second substrate 110.

Alternatively, instead of providing the first sensing electrode 210 and the first wiring electrode 310 on the first substrate 100, the first and second sensing electrodes 210 and 220 and the first and second wiring electrodes 310 and 320 may be provided only on two surfaces of the second substrate 110. The first sensing electrode 210 that extends in a given direction and the first wiring electrode 310 that is connected to the first sensing electrode 210 may be provided on one surface of the second substrate 110, and the second sensing electrode 220 that extends in a direction different from the given direction and the second wiring electrode 320 that is connected to the second sensing electrode 220 may be provided on the other surface of the second substrate 110.

Figure 17:
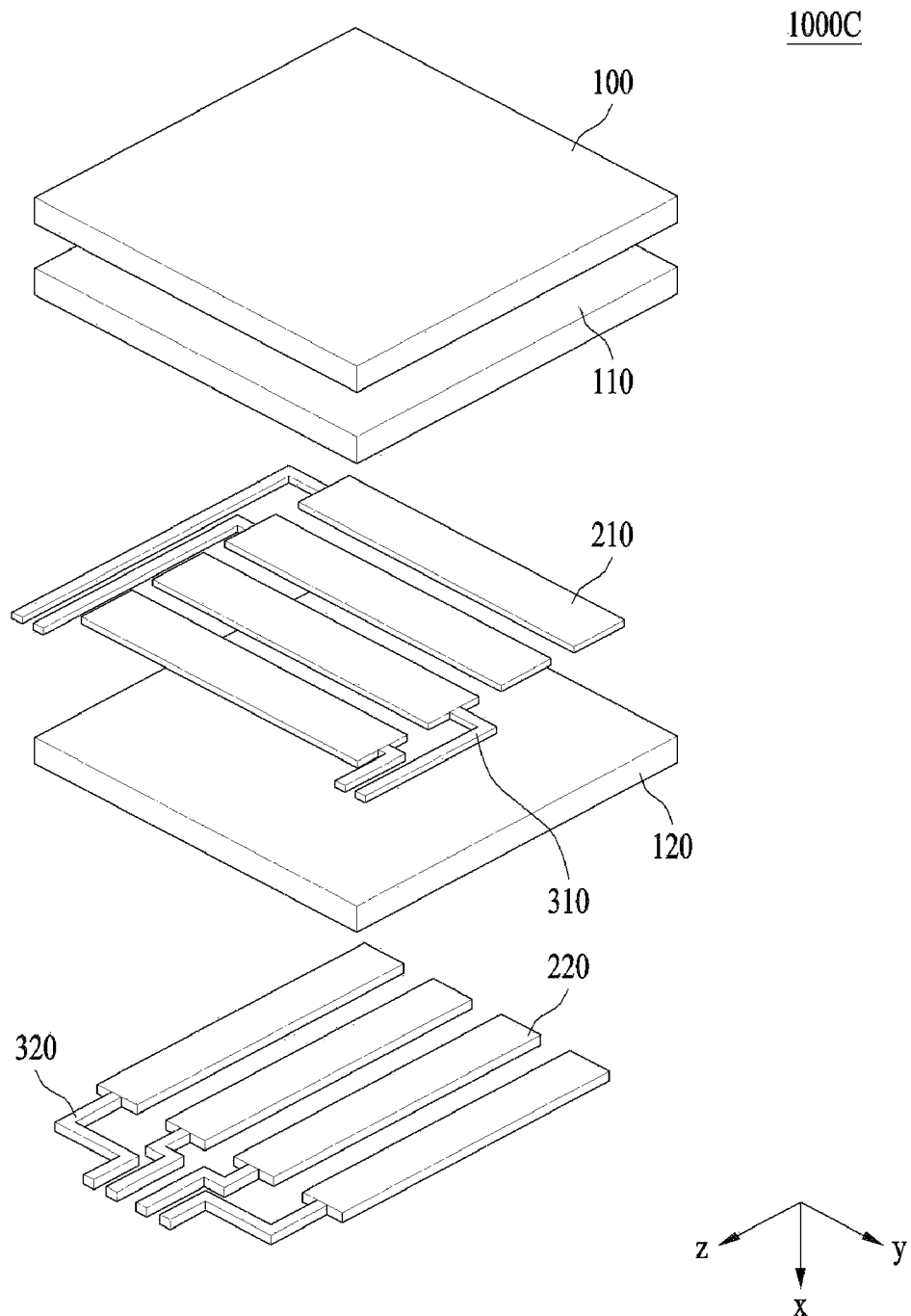
FIG. 17 is a perspective view of a touch-sensing apparatus according to still another embodiment.

Referring to FIG. 17, a touch-sensing apparatus 1000C according to still another embodiment may include first to third substrates 100, 110, and 120, the first and second sensing electrodes 210 and 220, and the first and second wiring electrodes 310 and 320. The first sensing electrode 210 that extends in a given direction and the first wiring electrode 310 that is connected to the first sensing electrode 210 may be provided on one surface of the second substrate 110. The second sensing electrode 220 that extends in a direction different from the given direction and the second wiring electrode 320 that is connected to the second sensing electrode 220 may be provided on one surface of the third substrate 120.

Figure 18:
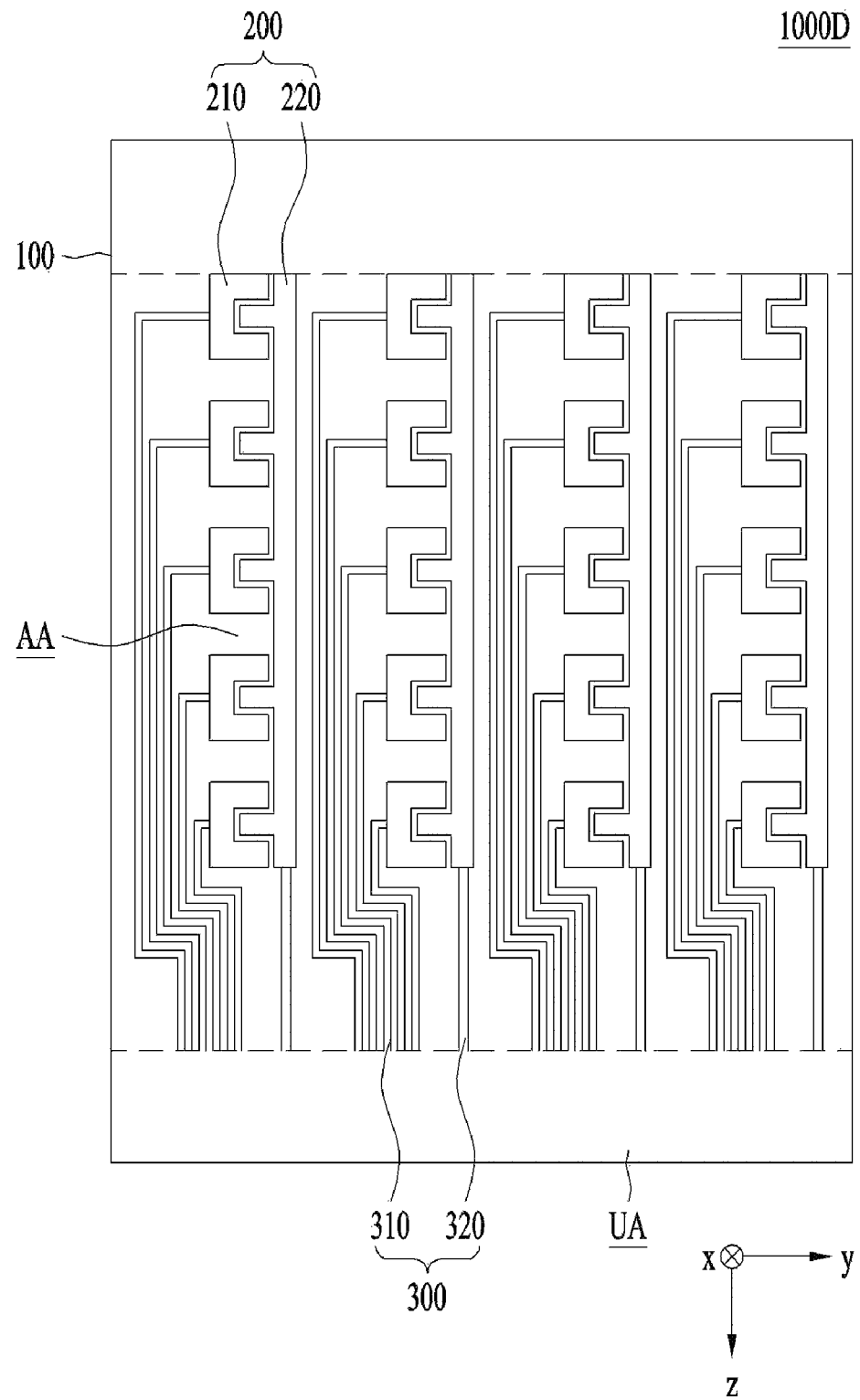
FIG. 18 is a plan view of a touch-sensing apparatus according to still another embodiment.

Referring to FIG. 18, a touch-sensing apparatus 1000D may include the substrate 100, the first sensing electrode 210, and the second sensing electrode 220. The first sensing electrode 210 and the second sensing electrode 220 may be provided to be spaced apart from each other on the same surface of the substrate 100. The first sensing electrode 210 and the first wiring electrode 310 that is connected to the first sensing electrode 210 may be provided in the effective area AA and the non-effective area UA of the substrate 100, and the second sensing electrode 220 and the second wiring electrode 320 that is connected to the second sensing electrode 220 may be provided in the effective area AA and the non-effective area UA of the substrate 100.

The fingerprint sensor 500 included in the above-described touch-sensing apparatuses 1000A to 1000D may be used for various purposes. For example, the fingerprint sensor 500 may be used in a field in which user authentication may be required. User authentication may be required in, for example, unlocking, approval of or non-repudiation of online trading, access to device systems including websites and e-mails and services, change of passwords and PINs, physical access to, for example, a door lock, various verifications in time and attendance management systems, mobile phones, finger-based input devices/navigation systems for gaming, or use of finger-based shortcuts. The fingerprint sensor may be required in various fields including, for example, user authentication, registration, approval, or security.

The above-described touch-sensing apparatuses may be applied to a touch device that may be coupled to a display panel. For example, the touch-sensing apparatuses 1000A to 1000D may be coupled to a display panel via a second adhesive layer. Touch devices 2000A to 2000C including the above-described touch-sensing apparatuses 1000A to 1000D and a display panel according to embodiments are described with reference to the accompanying drawings. In the touch devices 2000A to 2000C, same constituent elements as those illustrated in the touch-sensing apparatuses 1000A, 1000B, 1000C and 1000D according to the above-described embodiments may be given the same reference numerals, and a repeated description thereof has been omitted.

Figure 19:
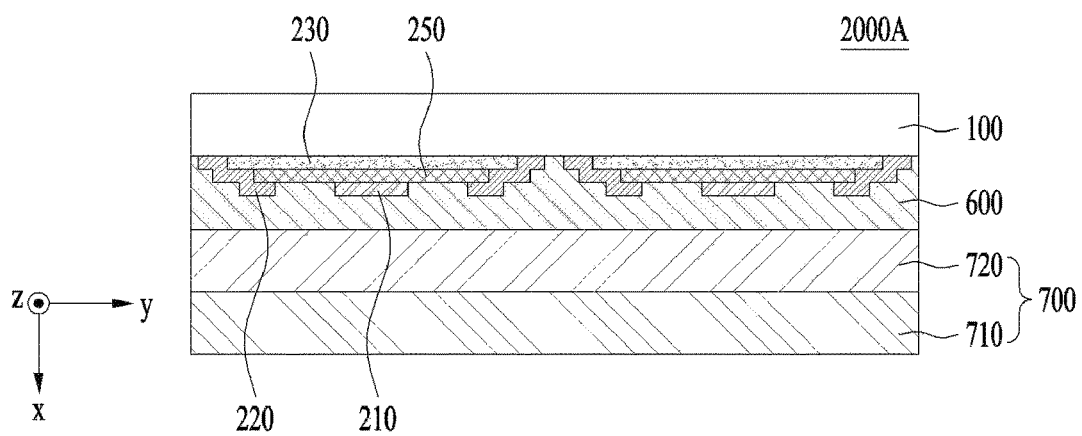
FIG. 19 is a cross-sectional view of a touch device according to an embodiment.

Referring to FIG. 19, a touch device 2000A, which may include a touch-sensing apparatus having sensing electrodes and wiring electrodes provided as an add-on type, may include the touch-sensing apparatus 1000A to 1000D and a display panel 700. The touch-sensing apparatus 1000A to 1000D may be provided on the display panel 700. The touch device 2000A may be formed by coupling the substrate 100 and the display panel 700 to each other.

The substrate 100 and the display panel 700 may be adhered to each other via a second adhesive layer 600. For example, the substrate 100 and the display panel 700 may be bonded to each other via the second adhesive layer 600, which may include an optically transparent adhesive such as, e.g., an optically clear adhesive (OCA) or an optically clear resin (OCR).

The display panel 700 may include a first panel substrate 710 and a second panel substrate 720. When the display panel 700 is a liquid-crystal display panel, the display panel 700 may be configured such that the first panel substrate 710, which includes a thin film transistor (TFT) and a pixel electrode, and the second panel substrate 720, which includes multiple color filter layers, are bonded to each other with a liquid-crystal layer interposed therebetween.

The display panel 700 may be a liquid-crystal display panel having a color-filter-on-transistor (COT) structure in which a thin film transistor, a color filter, and a black matrix may be formed on the first panel substrate 710, and the second panel substrate 720 may be bonded to the first panel substrate 710 with the liquid-crystal layer interposed therebetween. The thin film transistor may be formed on the first panel substrate 710, a protective layer may be formed on the thin film transistor, and the color filter layers may be formed on the protective layer.

The first panel substrate 710 may be provided with the pixel electrode, which may come into contact with the thin film transistor. In order to increase an aperture ratio and to simplify a mask process, the black matrix may be omitted and a common electrode may also serve as the black matrix. When the display panel 700 is a liquid-crystal display panel, a backlight unit may be further provided on the back surface of the display panel 700 so as to emit light.

If the display panel 700 is an organic field emission display panel, the display panel 700 may be a self-illuminating device that may require no separate light source. In the display panel 700, the thin film transistor may be formed on the first panel substrate 710, and an organic light-emitting element may be formed so as to come into contact with the thin film transistor. The organic light-emitting element may include an anode, a cathode, and an organic light-emitting layer formed between the anode and the cathode. The display panel 700 may further include the second panel substrate 720, which may serve as an encapsulation substrate, on the organic light-emitting element.

Figure 20:
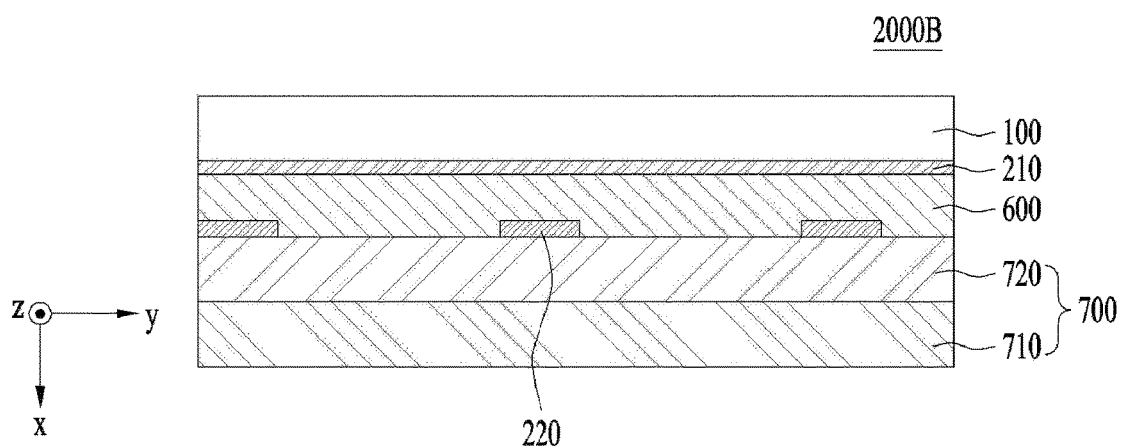
FIG. 20 is a cross-sectional view of a touch device according to another embodiment.

Referring to FIG. 20, a touch device 2000B, which may include a touch-sensing apparatus having sensing electrodes and wiring electrodes provided in an on-cell type, may include the substrate 100, the first and second sensing electrodes 210 and 220, the second adhesive layer 600, and the display panel 700.

In the touch device 2000B, the touch-sensing apparatus 1000A to 1000D may be integrally formed with the display panel 700. The substrate 100 that supports the sensing electrodes 210 and 220 may be omitted. At least one sensing electrode 210 and/or 220 may be provided on at least one surface of the display panel 700. At least one sensing electrode 210 and/or 220 may be formed on at least one surface of the first panel substrate 710 or the second panel substrate 720.

The first sensing electrode 210 and a first wiring connected to the first sensing electrode 210 may be provided on one surface of the substrate 100. The second sensing electrode 220 may be provided on one surface of the display panel 700. A second wiring connected to the second sensing electrode 220 may be provided.

The second adhesive layer 600 may be provided between the substrate 100 and the display panel 700 so as to bond the substrate 100 and the display panel 700 to each other. A polarizing plate may be further provided below the substrate 100. The polarizing plate may be a linear polarizing plate or an external light reflection prevention polarizing plate. For example, when the display panel 700 is a liquid-crystal display panel, the polarizing plate may be a linear polarizing plate. When the display panel 700 is an organic field emission display panel, the polarizing plate may be an external light reflection prevention polarizing plate.

Figure 21:
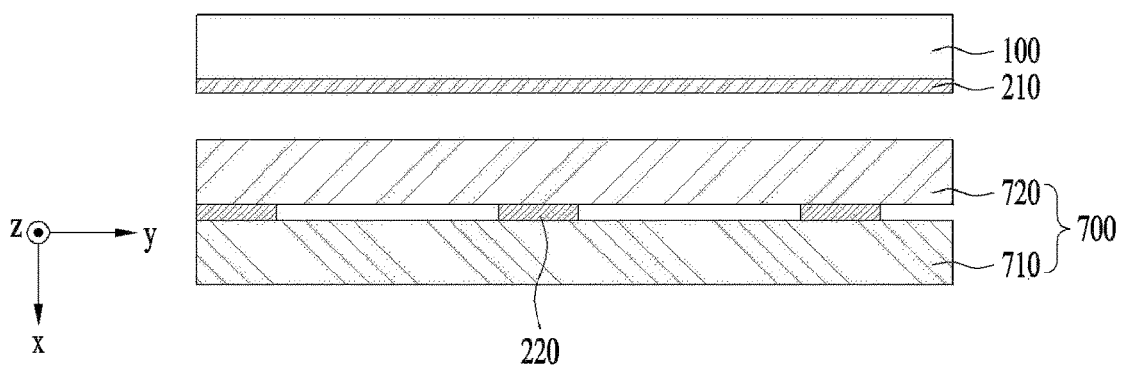
FIG. 21 is a cross-sectional view of a touch device according to still another embodiment.

Referring to FIG. 21, a touch device 2000C, which may include a touch-sensing apparatus including sensing electrodes and wiring electrodes provided in an in-cell type, may include the display panel 700 and the touch-sensing apparatus 1000A to 1000D. The touch-sensing apparatus 1000A to 1000D may be integrally formed with the display panel 700, and the substrate 100 that supports at least one sensing electrode 210 and/or 220 may be omitted.

For example, a sensing electrode provided in the effective area AA and that may serve as a touch sensor and a wiring that applies an electrical signal to the sensing electrode may be formed inside the display panel 700. At least one sensing electrode or at least one wiring may be formed inside the display panel 700.

The display panel 700 may include the first panel substrate 710 and the second panel substrate 720. At least one sensing electrode, among a first sensing electrode and a second sensing electrode, may be provided between the first panel substrate 710 and the second panel substrate 720. For example, at least one sensing electrode may be provided on at least one surface of the first panel substrate 710 or the second panel substrate 720. In FIG. 21, the first sensing electrode 210 and a first wiring connected to the first sensing electrode 210 may be provided on one surface of the substrate 100. The second sensing electrode 220 and a second wiring may be provided between the first panel substrate 710 and the second panel substrate 720. The second sensing electrode 220 and the second wiring may be provided inside the display panel 700, and the first sensing electrode 210 and the first wiring may be provided outside the display panel 700.

The second sensing electrode 220 and the second wiring may be provided on an upper surface of the first panel substrate 710 or a back surface of the second panel substrate 720. A polarizing plate may be further provided below the substrate 100. When the display panel is a liquid-crystal display panel and the second sensing electrode 220 is formed on the upper surface of the first panel substrate 710, the second sensing electrode 220 may be formed along with a thin film transistor (TFT) or a pixel electrode. When the second sensing electrode 220 is formed on the back surface of the second panel substrate 720, a color filter layer may be formed on the second sensing electrode 220, or the sensing electrode 220 may be formed on the color filter layer. When the display panel 700 is an organic field emission display panel and the second sensing electrode 220 is formed on the upper surface of the first panel substrate 710 or an organic light-emitting element.

In the touch device 2000C, at least one substrate 100 that supports the sensing electrode 220 may be omitted. Thus, the touch device 2000C may have a decreased thickness and a reduced weight. When the sensing electrode 220 and the wiring are formed along with constituent elements of the display panel 700, processing may be simplified and manufacturing costs may be reduced.

The touch-sensing apparatuses 1000A to 1000D according to the embodiments may be applied to various fields that require a fingerprint sensor. The touch-sensing apparatuses 1000A to 1000D or the touch devices 2000A to 2000C may be applied to various electronic appliances. For example, electronic appliances including the touch-sensing apparatuses 1000A to 1000D or the touch devices 2000A to 2000C may be mobile phones, smart phones, portable digital assistants (PDAs), portable multimedia players (PMPs), or portable terminals such as, for example, laptop computers, but the embodiments are not limited thereto.

Figure 22:
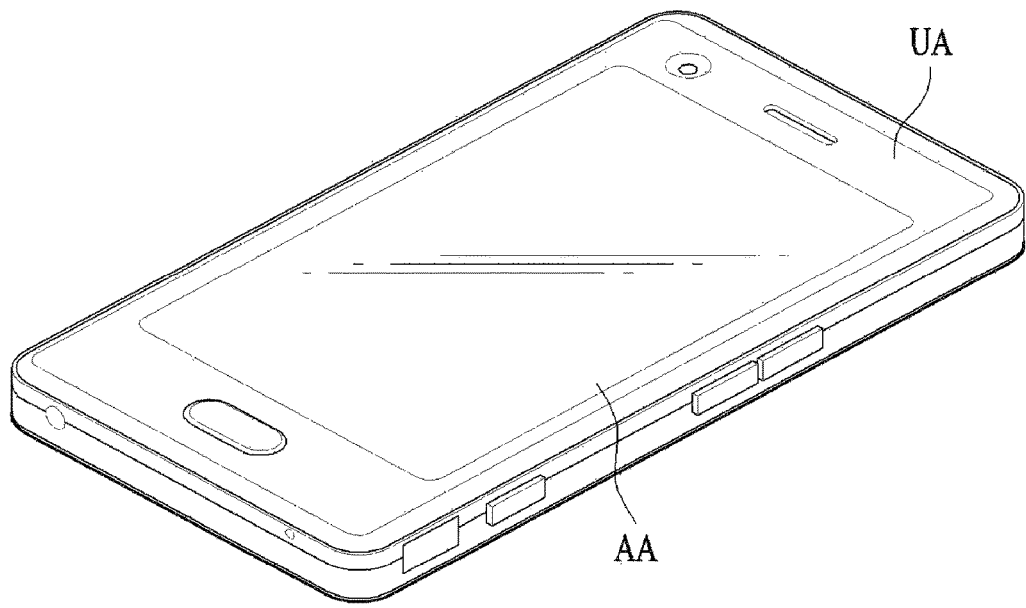
FIG. 22 is a perspective view of a portable terminal according to an embodiment.

Referring to FIG. 22, an electronic appliance including the touch-sensing apparatuses 1000A to 1000D according to the above-described embodiments may be a portable terminal. The portable terminal may include the effective area AA and the non-effective area UA. The portable terminal may perform predetermined functions such as, for example, a function of sensing a touch signal when a finger touches the effective area AA, and a function of turning power of the electronic appliance on/off, or releasing a sleep mode when the finger touches the cavity portion C, into which the fingerprint sensor 500 may be inserted, in the non-effective area UA.

When the touch-sensing apparatus is a flexible touch-sensing apparatus, a touch device including the touch-sensing apparatus may be a flexible touch device, and an electronic appliance including the touch device may also be a flexible electronic appliance that may be bendable or foldable. Such a flexible touch-sensing apparatus may be applied to, for example, a wearable touch field.

The touch-sensing apparatus according to embodiments provided may be applied not only to a touch device such as, for example, a mobile terminal, but also to an electronic appliance such as, for example, a vehicle navigation system. The touch-sensing apparatus, a touch device including the apparatus, and an electronic appliance including the touch-sensing apparatus or the touch device may be applied to internal parts of a vehicle. The electronic appliance including the touch-sensing apparatus or the touch device may be applied to various parts inside a vehicle. For example, the electronic appliance including the touch-sensing apparatus or the touch device may be applied not only to a personal navigation display (PND) but also to a dashboard so as to realize a center information display (CID). However, the embodiments are not limited thereto, and of course, there may be various other electronic appliances.

According to embodiments disclosed herein, a touch-sensing apparatus and an electronic appliance including the touch-sensing apparatus may have high recognition rate for touch or a fingerprint, may have various shapes provided in the touch-sensing apparatus, may improve adhesive strength between a decorative layer and a substrate, and may prevent misalignment.

According to embodiments disclosed herein, a touch-sensing apparatus may include a substrate having an effective area and a non-effective area; a first decorative layer provided within a cavity portion or cavity provided in the non-effective area of the substrate, and having at least one groove that exposes a bottom surface of the cavity portion; a second decorative layer provided inside the at least one groove of the first decorative layer; and a fingerprint or touch sensor provided on the first and second decorative layers, wherein the first decorative layer provided on the bottom surface of the cavity portion has a thickness ranging from 40 nm to 70 nm.

The second decorative layer embedded in the at least one grooves may correspond to a background of a shape viewed from the outside of the touch-sensing apparatus, and the first decorative layer in the vicinity of the at least one groove may correspond to the shape itself. The second decorative layer embedded in the at least one grooves may correspond to a shape itself viewed from the outside of the touch-sensing apparatus, and the first decorative layer in the vicinity of the at least one groove may correspond to a background of the shape. The touch-sensing apparatus may further include a third decorative layer provided in a portion other than the cavity portion in the non-effective area of the substrate.

The first decorative layer may include a (1-1) decorative layer provided on the bottom surface of the cavity portion and having the at least one groove, may further include a (1-2) decorative layer provided to extend from the (1-1) decorative layer to a side surface of the cavity portion, and may further include a (1-3) decorative layer provided to extend from the (1-2) decorative layer to an upper surface of the third decorative layer. The (1-2) decorative layer may have a curved cross-sectional shape. A cross-sectional shape of the (1-2) decorative layer may be identical to a cross-sectional shape of the cavity portion.

The second decorative layer may include a (2-1) decorative layer provided within the at least one groove formed in the first decorative layer, may further include a (2-2) decorative layer provided on the (2-1) decorative layer and the (1-1) decorative layer, may further include a (2-3) decorative layer provided to extend from the (2-2) decorative layer to an upper portion of the (1-2) decorative layer, and may further include a (2-4) decorative layer provided to extend from the (2-3) decorative layer to an upper portion of the (1-3) decorative layer.

A material of the second decorative layer may be identical to a material of the third decorative layer. A thickness of the (1-1) decorative layer may be identical to a thickness of the third decorative layer. The first decorative layer may include at least one of a metal layer or at least one oxide layer. A thickness of the second decorative layer provided within the at least one groove may be identical to a thickness of the first decorative layer in which the at least one groove is formed. The touch-sensing apparatus may further include an adhesive layer provided between the fingerprint sensor and at least one of the bottom surface or a side surface of the cavity portion. The thickness of the adhesive layer may range from 10 μm to 40 μm.

A touch device according to embodiments disclosed herein may include the touch-sensing apparatus, and a display panel connected to the touch-sensing apparatus. An electronic appliance according to embodiments disclosed herein may include the touch-sensing apparatus or the touch device.

In the previous description of the embodiments, it may be understood that, when each element is referred to as being formed "on" or "under" the other element, it may be directly "on" or "under" the other element or be indirectly formed with one or more intervening elements therebetween. In addition, it may also be understood that "on" or "under" the element may mean an upward direction and a downward direction of the element. In addition, relative terms such as, for example, "first", "second", "on/upper/above" and "beneath/lower/below", used in the previous description may be used to distinguish any one substance or element with another substance or element without requiring or containing any physical or logical relationship or sequence between these substances or elements.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch-sensing apparatus, comprising:
   a substrate including an effective area and a non-effective area;
   a first decorative layer provided within a cavity provided in the non-effective area of the substrate, and having at least one groove that exposes a bottom surface of the cavity;
   a second decorative layer provided inside the at least one groove of the first decorative layer;
   a touch sensor provided on the first and second decorative layers; and
   an adhesive layer provided between the touch sensor and at least one of the bottom surface or a side surface of the cavity,
   wherein the first decorative layer provided on the bottom surface of the cavity has a thickness ranging from 40 nm to 70 nm.

2. The touch-sensing apparatus according to claim 1, wherein the second decorative layer in the at least one groove includes a shape, which is visible from outside of the touch-sensing apparatus, and
   wherein the second decorative layer in the at least one groove corresponds to a background of the shape.

3. The touch-sensing apparatus according to claim 1, wherein the second decorative layer in the at least one groove includes a shape, which is visible from outside of the touch-sensing apparatus, and
   wherein the first decorative layer in the at least one groove corresponds to a background of the shape.

4. The touch-sensing apparatus according to claim 1, further comprising a third decorative layer provided in a portion other than the cavity portion in the non-effective area of the substrate.

5. The touch-sensing apparatus according to claim 4, wherein the first decorative layer includes a first-first decorative layer provided on the bottom surface of the cavity and having the at least one groove.

6. The touch-sensing apparatus according to claim 5, wherein the first decorative layer further includes a first-second decorative layer provided to extend from the first-first decorative layer to a side surface of the cavity.

7. The touch-sensing apparatus according to claim 6, wherein the first decorative layer further includes a first-third decorative layer provided to extend from the first-second decorative layer to an upper surface of the third decorative layer.

8. The touch-sensing apparatus according to claim 7, wherein the first-second decorative layer has a curved cross-sectional shape.

9. The touch-sensing apparatus according to claim 7, wherein a cross-sectional shape of the first-second decorative layer is identical to a cross-sectional shape of the cavity.

10. The touch-sensing apparatus according to claim 7, wherein the second decorative layer includes a second-first decorative layer provided within the at least one groove formed in the first decorative layer.

11. The touch-sensing apparatus according to claim 5, wherein a thickness of the first-first decorative layer is identical to a thickness of the third decorative layer.

12. The touch-sensing apparatus according to claim 4, wherein a material of the second decorative layer is identical to a material of the third decorative layer.

13. The touch-sensing apparatus according to claim 4, wherein the first decorative layer includes at least one of a metal layer or at least one oxide layer.

14. The touch-sensing apparatus according to claim 1, wherein a thickness of the second decorative layer provided within the at least one groove is identical to a thickness of the first decorative layer in which the at least one groove is formed.

15. The touch-sensing apparatus according to claim 1, wherein a thickness of the adhesive layer ranges from 10 μm to 40 μm.

16. An electronic appliance, comprising:
a touch device including;
a touch-sensing apparatus; and
a display panel connected to the touch-sensing apparatus, wherein the touch-sensing apparatus includes:
a substrate having an effective area and a non-effective area;
a first decorative layer provided within a cavity provided in the non-effective area of the substrate, and having at least one groove that exposes a bottom surface of the cavity;
a second decorative layer provided inside the at least one groove of the first decorative layer;
a fingerprint sensor provided on the first and second decorative layers; and
an adhesive layer provided between the fingerprint sensor and at least one of the bottom surface or a side surface of the cavity,
wherein the first decorative layer provided on the bottom surface of the cavity has a thickness ranging from 40 nm to 70 nm.

* * * * *